United States Patent
Hochman

(10) Patent No.: US 9,476,575 B2
(45) Date of Patent: Oct. 25, 2016

(54) VIDEO DISPLAY MODULE SUPPORT ASSEMBLY

(71) Applicant: REVOLUTION DISPLAY, LLC, Glendale, CA (US)

(72) Inventor: Jeremy Hochman, Walnut, CA (US)

(73) Assignee: Revolution Display, LLC, Glendale, CA (US)

( * ) Notice: Subject to any disclaimer, the term of this patent is extended or adjusted under 35 U.S.C. 154(b) by 217 days.

(21) Appl. No.: 14/195,630

(22) Filed: Mar. 3, 2014

(65) Prior Publication Data

US 2014/0247612 A1    Sep. 4, 2014

Related U.S. Application Data

(60) Provisional application No. 61/772,109, filed on Mar. 4, 2013.

(51) Int. Cl.
*F16M 11/22* (2006.01)
*F16M 13/02* (2006.01)
(Continued)

(52) U.S. Cl.
CPC ............ *F21V 21/26* (2013.01); *F16M 11/041* (2013.01); *F16M 11/22* (2013.01); *F16M 13/02* (2013.01); *G06F 3/1446* (2013.01); *F16M 2200/02* (2013.01)

(58) Field of Classification Search
CPC .... F16M 11/041; F16M 11/22; F16M 13/02; F16M 2200/02; F21V 21/26; G06F 3/1446; A47F 5/00
USPC ......... 248/125.3, 125.9, 289.1, 354.5, 354.6; 211/169, 170, 182
See application file for complete search history.

(56) References Cited

U.S. PATENT DOCUMENTS 3,081,972 A * 3/1963 Gray, Jr. ............. G09F 15/0087
108/10
4,295,624 A * 10/1981 Granada .............. A47B 23/043
248/456

(Continued)

FOREIGN PATENT DOCUMENTS

CN       201957366        8/2011
DE    102006014800 A1    10/2007
(Continued)

OTHER PUBLICATIONS

International Search Report dated Mar. 31, 2015, in corresponding International Application No. PCT/US2014/020354, filed Mar. 4, 2014.

*Primary Examiner* — Tan Le
(74) *Attorney, Agent, or Firm* — Downs Rachlin Martin PLLC

(57) ABSTRACT

Disclosed is a video display module support system containing an attachment plate formed with a first and a second video support member. The attachment plate includes a horizontal attachment assembly and a vertical attachment assembly. The horizontal attachment assembly includes a fixed, video support member attachment portion and a pivotable, member body pivotally attached to the first attachment portion. The pivot member body including a video support member mount having a latch pivotable between open and closed positions. The vertical attachment assembly includes a mounting arm ratchet assembly and a mounting arm movable between a first position secured by a mounting arm ratchet and a second position unsecured by a mounting arm ratchet.

11 Claims, 21 Drawing Sheets

(51) Int. Cl.
   *F21V 21/26* (2006.01)
   *G06F 3/14* (2006.01)
   *F16M 11/04* (2006.01)

(56) References Cited

U.S. PATENT DOCUMENTS

| | | | |
|---|---|---|---|
| 6,813,853 B1 * | 11/2004 | Tucker | G09F 9/33 |
| | | | 340/815.45 |
| 6,972,689 B1 | 12/2005 | Morgan et al. | |
| 7,055,271 B2 * | 6/2006 | Lutz | G09F 7/18 |
| | | | 40/452 |
| 7,063,449 B2 | 6/2006 | Ward | |
| 8,007,121 B2 | 8/2011 | Elliott et al. | |
| 8,172,097 B2 | 5/2012 | Nearman et al. | |
| 2004/0233125 A1 | 11/2004 | Tanghe et al. | |
| 2005/0081414 A1 | 4/2005 | Lutz et al. | |
| 2005/0201087 A1 | 9/2005 | Ward | |
| 2007/0000849 A1 * | 1/2007 | Lutz | G09F 9/3026 |
| | | | 211/26 |
| 2007/0176854 A1 | 8/2007 | Ward et al. | |
| 2007/0218751 A1 | 9/2007 | Ward | |
| 2009/0309819 A1 | 12/2009 | Elliott et al. | |
| 2012/0120033 A1 | 5/2012 | Mittan et al. | |
| 2012/0324771 A1 * | 12/2012 | Safavi | G09F 9/33 |
| | | | 40/452 |
| 2014/0020982 A1 * | 1/2014 | Hayman | E04G 1/14 |
| | | | 182/223 |
| 2014/0247612 A1 * | 9/2014 | Hochman | F21V 21/26 |
| | | | 362/427 |

FOREIGN PATENT DOCUMENTS

| | | |
|---|---|---|
| EP | 1524640 A2 | 4/2005 |
| WO | 2008112152 A1 | 9/2008 |

* cited by examiner

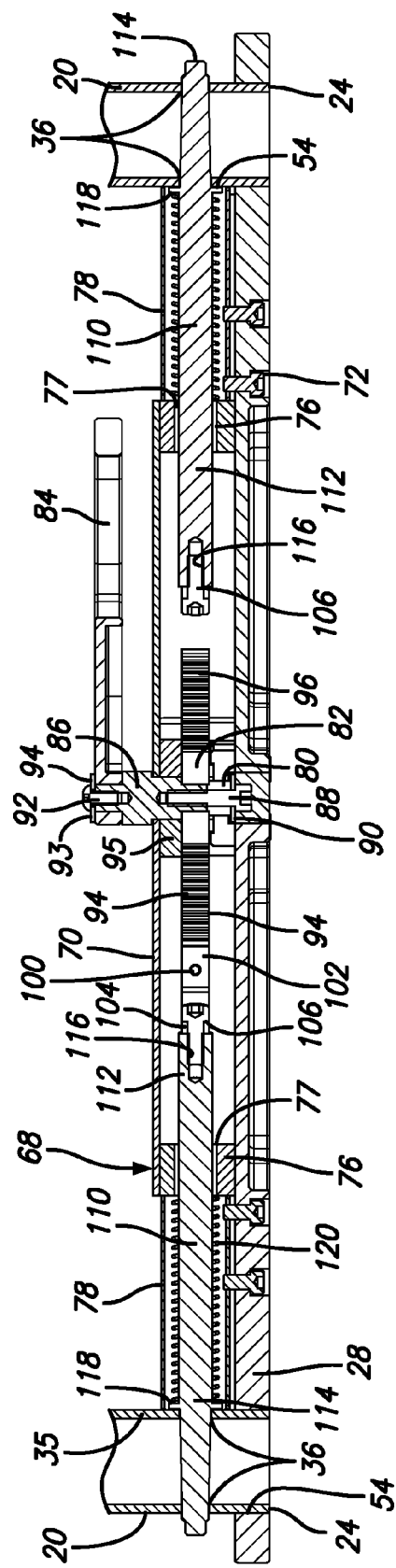

VIDEO DISPLAY MODULE SUPPORT ASSEMBLY

BACKGROUND

1. Field

This invention relates to the mechanical arts. In particular, it relates to a support assembly for a video display module.

2. Background

Spectators at events in temporary locations, such as arena concerts, theatre concerts, trade shows and the like have come to expect more and more of the visual experience. To satisfy this expectation, it is known to provide large video displays comprised of an array of modular video display assemblies. Typically, connectors for adjacent video display modules have required that the displays be planar displays. To enhance the flexibility of the visual experience, there is a desideratum that adjacent assemblies can be curved. Furthermore, because of temporary nature of such displays, it is necessary that that the video array can be simply, quickly and safely erected at a first event and then disassembled to be moved to the next event where the video display modules may be used in a different configuration.

However, there is a long felt need for the flexibility provided by a hinged connector, so that adjacent assemblies cannot only be effectively attached in a seamless planar orientation, but may be effectively attached in other orientations.

SUMMARY OF THE INVENTION

Now in accordance with the invention, there has been found a video display module assembly employing the hinged connector that provide these and related advantages. In one aspect, a video display module support assembly comprises a light emitting tile having a front surface and a back surface, an attachment plate having a top, a bottom, two opposing sides, back surface and a front surface, where the front surface of the attachment plate is attached to the back surface of the video tile, and a support frame having a front and a back, where the front surface of the support frame is attached to the back surface of the attachment plate.

And in one aspect, the support frame comprises a first vertical support member having a top end and a bottom end, a second vertical support member having a top end and a bottom end, a first cross brace having a top surface, a bottom surface and first and second ends, the first end of the first cross member secured to the top end of the first vertical support member and the second end of the first cross member secured to the top end of the second vertical support member, a second cross brace having a top surface, bottom surface and first and second ends. The first end of the second cross brace is secured to the bottom end of the first vertical support member and the second end of the first cross brace is secured to the bottom end of the second vertical support member.

In one aspect, the support frame includes a vertical locking assembly secured to the top surface of the second cross brace. In one embodiment, the vertical locking assembly is secured to the top surface of the second cross brace.

And in one embodiment, the vertical locking assembly comprises a first locking pin and a second locking pin. Each locking pin is simultaneously movable between a locked position wherein the first and second locking pins extend into the first and second opposing locking pin openings and an unlocked position wherein the first and second locking pins are withdrawn from the first and second opposing locking pin openings.

In one embodiment, the vertical locking assembly further comprises a first tooth and pinion gear operably connected to the first locking pin and a second tooth and pinion gear operably connected to the second locking pin. A handle is operably connected to the first tooth and pinion gear and the second tooth and pinion gear, such that the handle causes the first and second locking pins to move between the locked and the unlocked positions.

In one aspect, the first and second cross braces further comprise a first support member opening adjacent the first end of each of the first and second cross braces and a second support member opening adjacent the second end of each of the first and second cross braces. The first support member is inserted through each of the first support member openings and the second support member is inserted through each of the second support member openings, and a first fastener secures the first support member to the first end and a second fastener secures the second support member to the second end. In one embodiment, each of the first and second cross braces are removably attached to the first and second vertical support members.

In one aspect, each of the first and second cross members further comprises a front surface and a back surface. In one embodiment, an expansion slot extends from at least one of the support member openings to the front surface or the back surface of the at least one cross member and a threaded bore extends from the front surface or the back surface past the expansion slot.

And in one aspect, the support frame further comprises a first locating pin having a circular cross section extending axially from the top of the first vertical support member, a second locating pin having a circular cross section extending axially from the top of the second vertical support member, an axial first locating pin bore in the bottom of the first support member, the first locating pin bore having a diameter slightly larger than the diameter of the first locating pin and an axial second locating pin bore in the bottom of the first support member, the second locating pin bore having a diameter slightly larger than the diameter of the second locating pin.

In one aspect, a support frame comprises a first vertical support member having a top end and a bottom end, a second vertical support member having a top end and a bottom end, a first cross brace extending from the top of the first support member to the top of the second support member and a second cross brace extending from the bottom of the first support member to the bottom of the second support member. The first and second cross members each comprise at least one substantially planar front surface, a back surface, a first end and an opposing second end. The back surface of at least one of the first and second cross member comprises at least one transversely extending step portion.

And in one aspect, a horizontal attachment assembly comprises a pivot member comprising a fixed, first video support member attachment portion and a pivotable, member body pivotally attached to the first attachment portion. The pivot member body includes a video support member mount and the video support member mount includes a latch pivotable between open and closed positions. In one embodiment, the first video support member attachment portion includes a video support member attachment opening.

In one aspect, a support frame comprises a first vertical support member having a top end and a bottom end, a second vertical support member having a top end and a bottom end, a first cross member extending from the top of the first support member to the top of the second support member, and a second cross member extending from the bottom of the first support member to the bottom, of the second support member. The support assembly includes a horizontal attachment assembly comprising a pivot member and the pivot member comprises a fixed, first video support member attachment portion and a pivotable, video support member second attachment portion pivotally attached to the first attachment portion. The first video support member attachment portion attached to the first vertical support member and the second video support member attachment portion includes a second video support member mount.

In one embodiment, the first attachment portion further comprise a substantially planar top surface and a substantially planar bottom surface. A first video support member collar is secured to the first vertical support member and abuts the top planar surface. A second video support member collar is secured to the first vertical support member and abuts the bottom planar surface. Together the first and second video support member collars securing the horizontal attachment assembly to the first video support member. In another embodiment, the first and second video support member collars are slidably attached to the first vertical support member.

And in another embodiment, the first video support member has a circular cross section. Each video support member collar further comprises a video support member opening having a diameter slightly larger than the outer diameter of the first video support member, a top surface and a back surface and an expansion slot extending from the video support member opening to the front surface or the back surface of the at least one cross member and a threaded bore extending from a side of the collar past the expansion slot.

In one aspect, an attachment plate has a top, a bottom, two opposing sides, back surface and a front surface. At least one vertical mounting assembly is mounted on the back surface of the video attachment plate. The at least one vertical mounting assembly comprises a mounting arm ratchet assembly and a mounting arm movable between a first position secured by a mounting arm ratchet and a second position unsecured by a mounting arm ratchet.

In one embodiment, the mounting arm comprises a top, a bottom, a back, a front and first and second opposing sides, with a transverse notch in the front side. The at least one mounting arm support has a first mounting arm slot for slidably supporting the mounting arm for movement in a longitudinal direction. The mounting arm ratchet assembly comprises a mounting arm ratchet assembly housing and the mounting arm ratchet assembly housing comprises a top, a bottom, a back a front and two opposing sides. A mounting arm slot formed in the front side of the housing for receiving a mounting arm, where the first mounting arm slot and the second mounting arm slot are axially aligned A pivotal ratchet assembly supported in the housing, comprises a ratchet body stop pin for engaging the lateral groove on the mounting arm, when the mounting arm is in the second position.

In one embodiment, the attachment plate further comprises at least one mounting arm support for slidably supporting the mounting arm. And in one embodiment, the mounting arm ratchet includes a trigger for releasing a mounting arm from the first position.

BRIEF DESCRIPTION OF THE DRAWINGS

The accompanying drawings, together with the specification, illustrate exemplary embodiments, and, together with the description, serve to explain the principles of these embodiments.

FIG. 5 is broken away view of a portion of FIG. 2 taken along line 5-5.

DETAILED DESCRIPTION OF THE PREFERRED EMBODIMENTS

Particular embodiments of the invention are described below in detail for the purpose of illustrating its principles and operation. However, various modifications may be made, and the scope of the invention is not limited to the exemplary embodiments described below. For example, while specific focus is made on LED displays, it can be appreciated that the invention is of equal utility with other video displays, such as LCD displays, plasma displays, OLED displays and the like.

Figure 1:
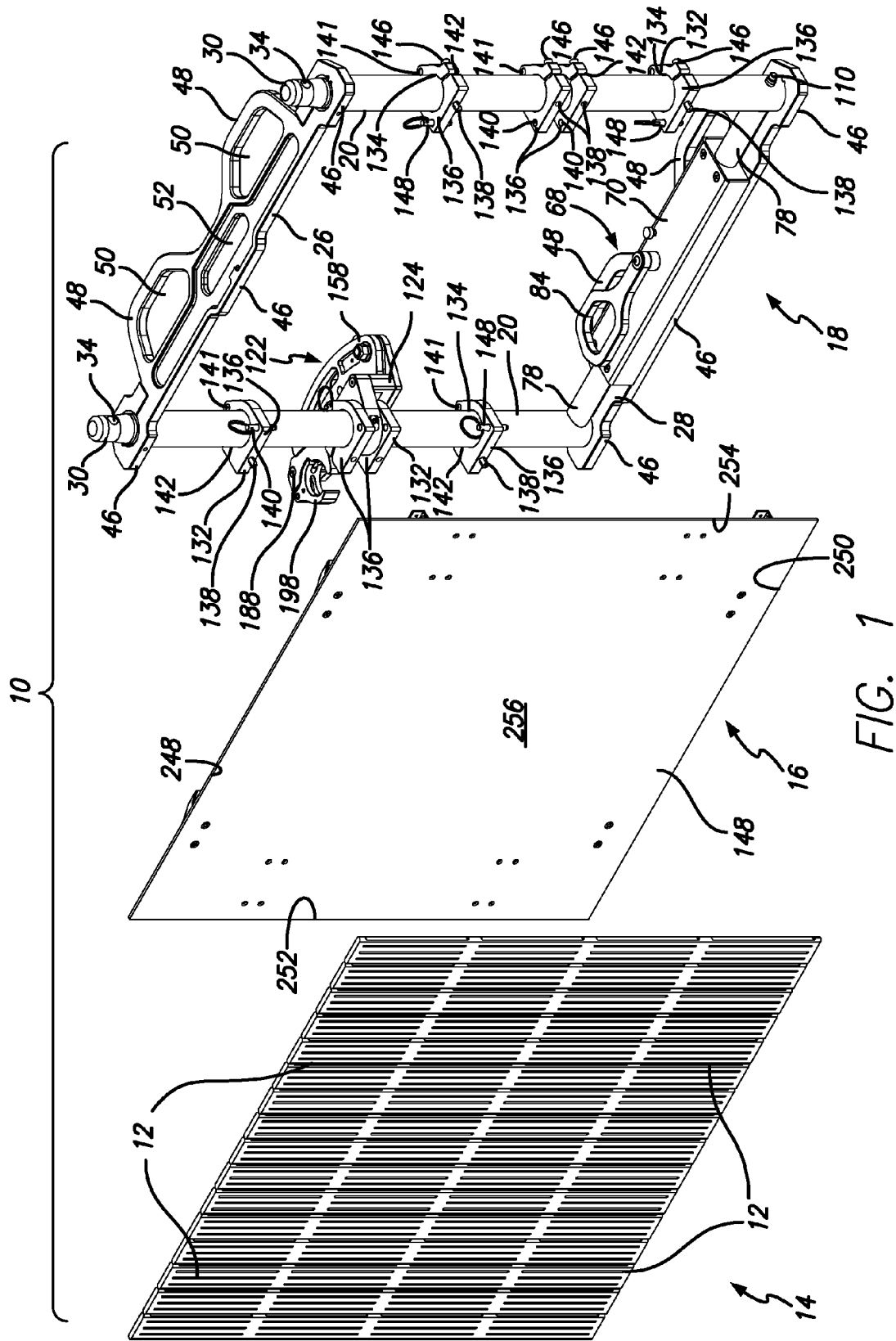
FIG. 1 is an exploded, front perspective view of a video display module in accordance with one aspect of the invention.

Shown in FIG. 1 is an exploded front perspective view of a video display system 10 in accordance with one aspect of the invention. The embodiment shown in FIG. 1 includes a plurality of LED modules 12 that comprise a light emitting tile 14 and an attachment plate 16 for mounting the LED modules on a support frame 18.

Figure 2:
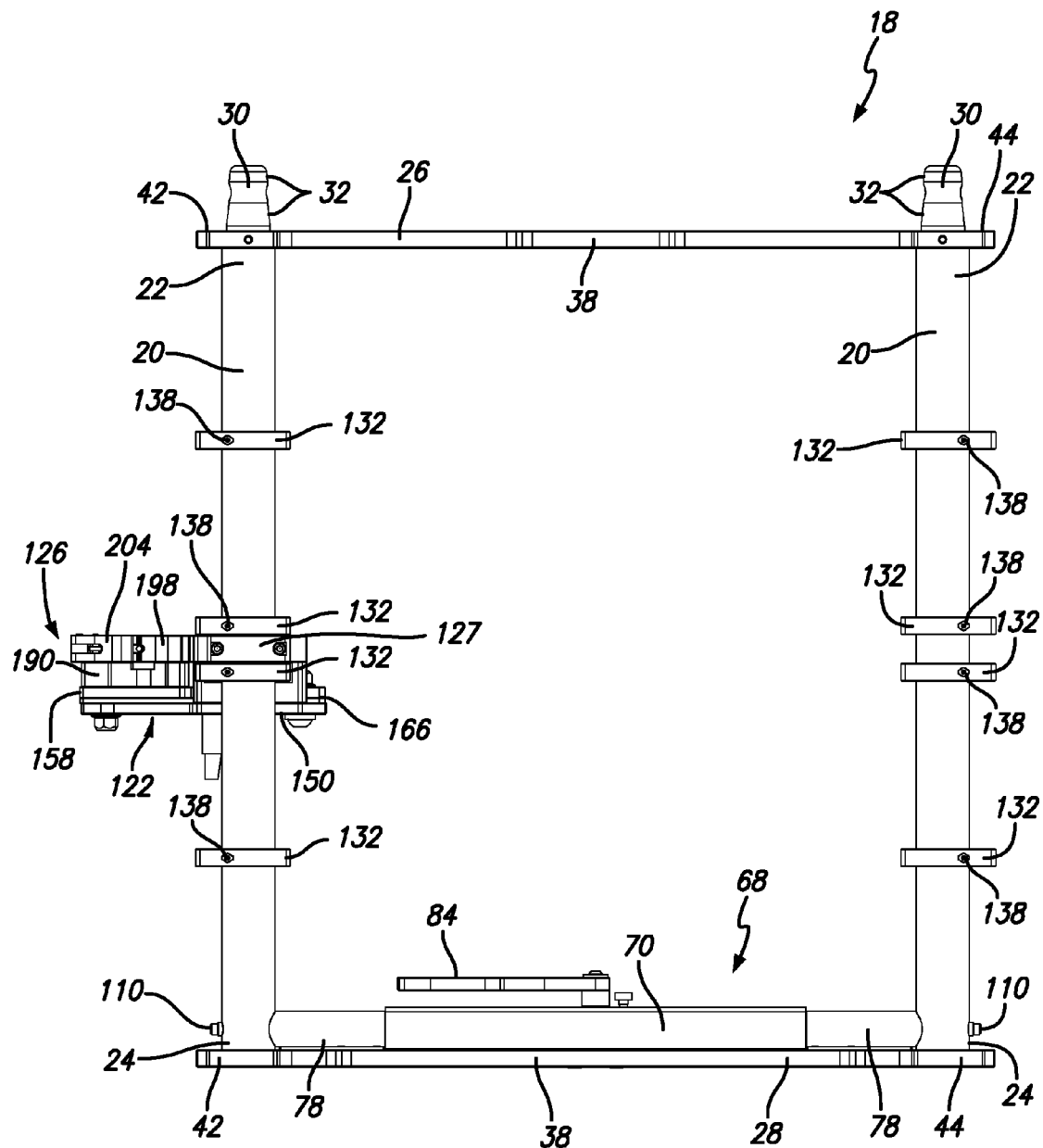
FIG. 2 is a front plan view of a support frame in accordance with one aspect of the invention.

Various aspects of the support frame 18 are shown in FIGS. 2-12. FIG. 2 is a front plan view of a support frame in accordance with one aspect of the invention. The frame is formed of two support members 20, each having a top end 22 and a bottom end 24. The support members are spaced apart by a top cross brace 26 extending between the support members at the top of each support member and a bottom cross brace 28 extending between the support members at the bottom of each support member. The support member can have any suitable shape. For example, in some aspects, the support has a square or rectangular shape. The support members, as well as the upper and lower cross braces are made of any suitable material. Representative materials include, without limitation, metals, such as stainless steel, engineering plastics, fiberglass, tegris, carbon fiber materials and carbon fiber-wrapped aluminum.

It is a distinct advantage of the invention, that a variety of different LED tiles having differing dimensions can be supported on a support frame in accordance with the invention by selecting support members and cross braces having suitable lengths to create support structures having the desired dimensions. The support members 20 can have any suitable shape, with a cylindrical shape and with an axial cylindrical bore 29 (FIG. 8) being preferred. In some aspects, extending axially from the top 22 of each support member is a locating pin 30. As seen, for example, in FIGS. 3 and 4, right side and left side plan views of an exemplary support frame, in some aspects each locating pin includes at least one tapered portion 32 (two shown in the embodiment of FIGS. 3 and 4) and a lock pin bore 34. The locating pin may be formed on or secured to the top of each support member by any suitable means. For example, in a representative embodiment, the locating pin is secured in the cylindrical bore using a compression fit.

Figure 5A:
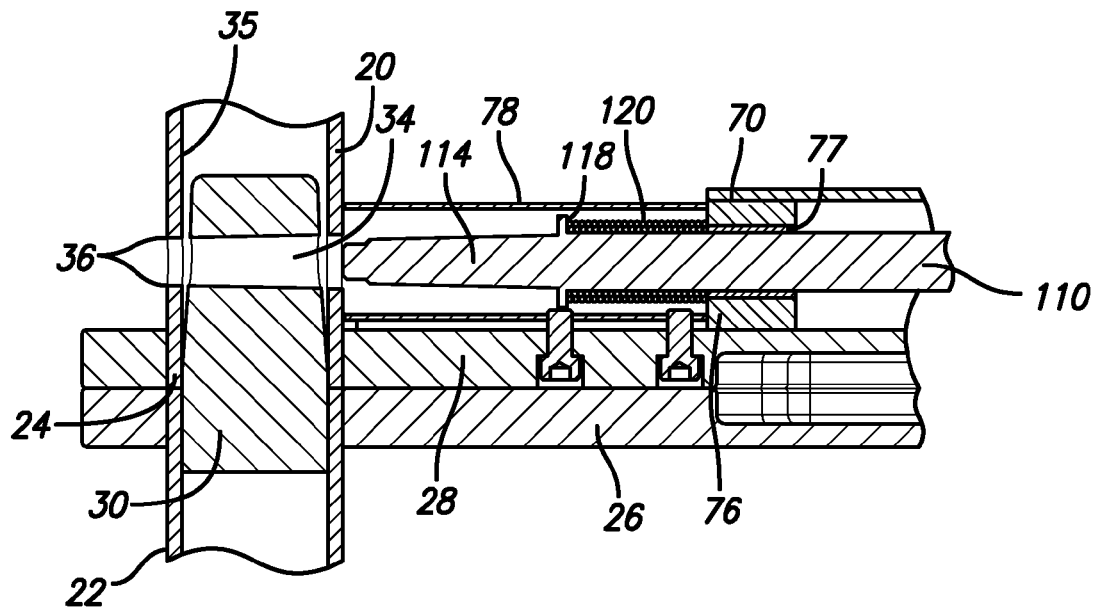
FIG. 5A is a portion of FIG. 5 showing a lock pin in its retracted position.
Figure 5B:
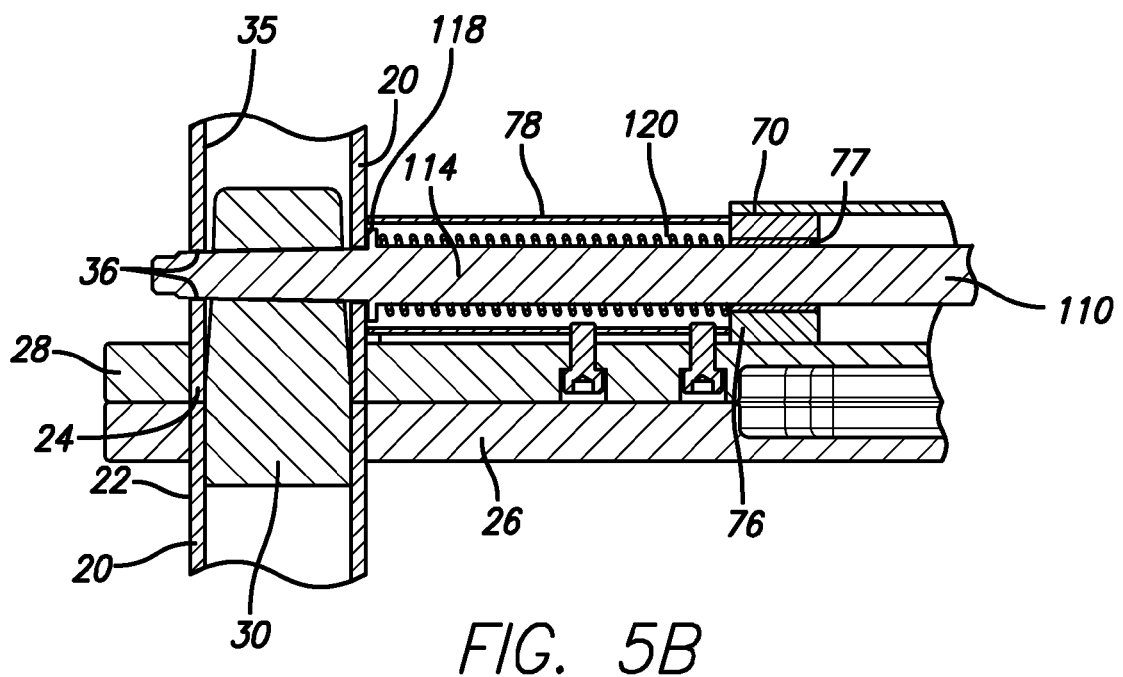
FIG. 5B is a portion of FIG. 5, along with a portion of a second support frame, showing the lock pin in its extended position.

FIGS. 5, 5A and 5B are broken away views of a portion of FIG. 2. In some aspects formed in the bottom of each support member 20 is an axial locating pin bore 35 having a diameter slightly larger than the diameter of the locating pin 30. As seen in the exemplary embodiment shown in FIGS. 5, 5A and 5B, the bottom 24 of each support member 20 includes a pair of opposing lock pin openings 36. Each pair of lock pin openings in the bottom of a support member is positioned so that the pair of openings aligns with a locating pin aperture 34, when a locating pin 36 is inserted in a locating pin bore 35.

Figure 7:
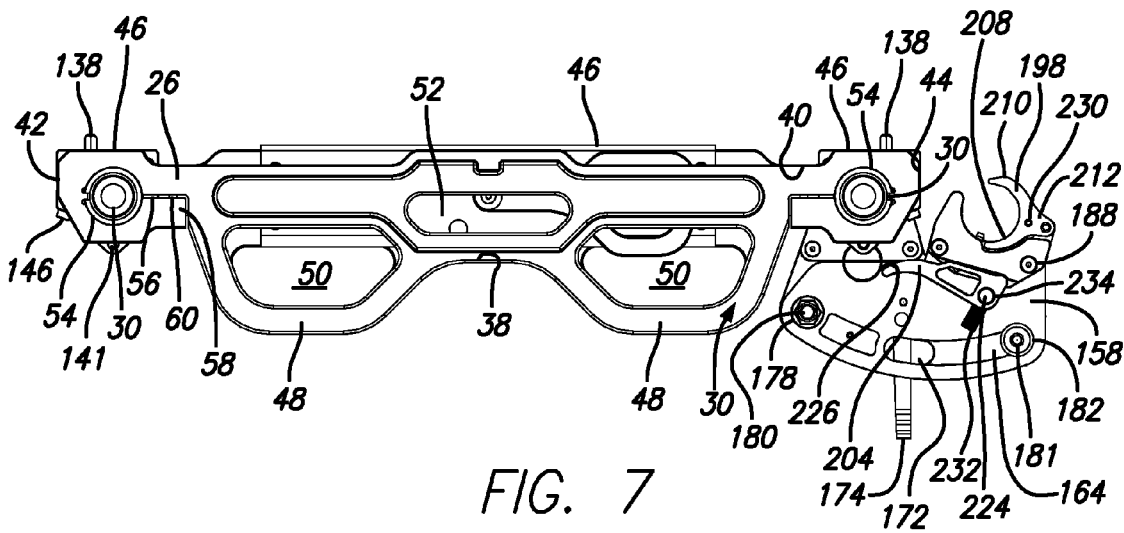
FIG. 7 is a top plan view of the support frame of FIG. 2.
Figure 8:
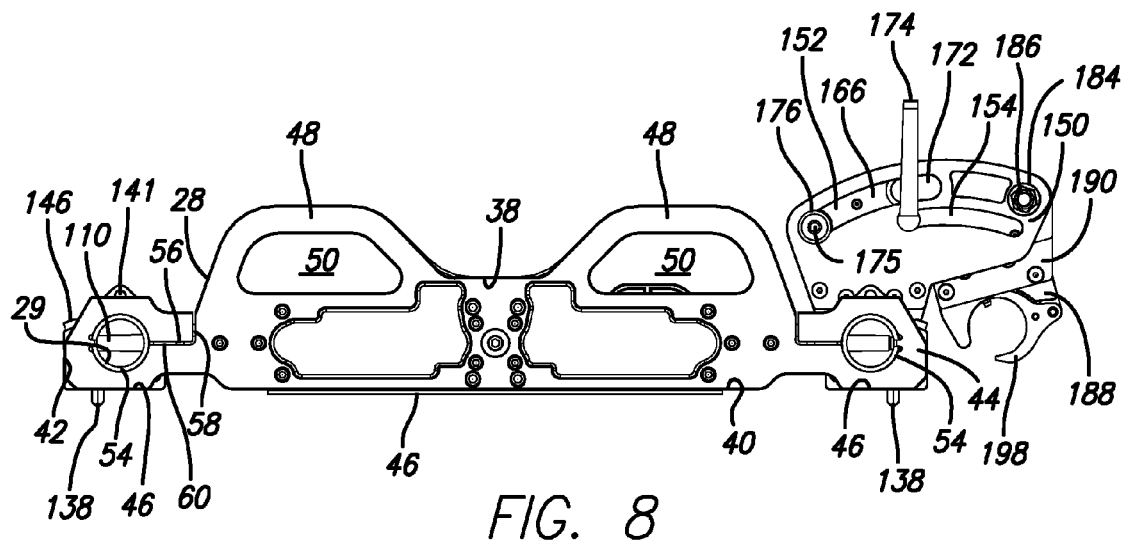
FIG. 8 is a bottom plan view of the support frame of FIG. 2.
Figure 9:
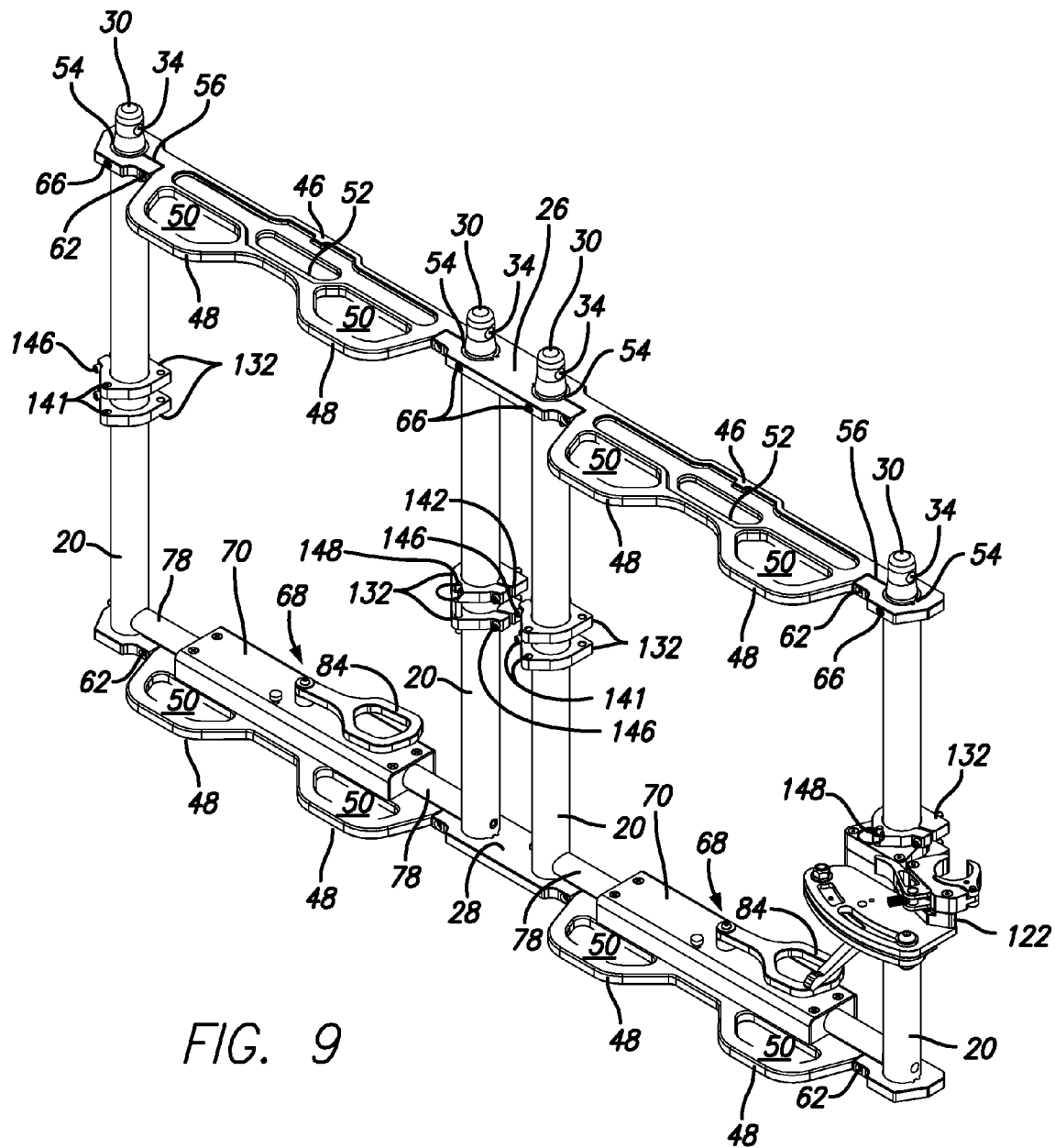
FIG. 9 a back perspective view of a second embodiment of a support frame in accordance with the invention.

Turning to FIGS. 7 and 8, there are shown top and bottom plan views of an exemplary embodiment of the support frame 18. Each cross brace 26 and 28 has a back surface 38, a front surface 40, a first end 42, and an opposing second end 44. In some aspects, the front surface defines at least one substantially planar, transverse attachment plate contact surface. In the embodiment shown, for example in FIGS. 7 and 8, the front surfaces define three attachment plate contact surfaces 46, one attachment plate contact surface located at each end of each front surface and one located in the central portion of each front surface.

Extending transversely from each back surface 38 are two step portions 48, each with a step portion opening 50. The step portions serve as steps for climbing the assembled video structure 10. Additionally, the step portion openings, along with a top cross brace opening 52 in a central portion of the top cross brace 26 (FIG. 7), are configured to serve as handles for transporting the frames and assembling the video display structure.

The cross braces 26 and 28 can be attached to the support members 20 by any suitable method. In some aspects, the cross braces are removably attached to the support members. As seen, for example, in the representative embodiment shown in FIGS. 7 and 8, located at the ends, 42 and 44, of each cross brace is an axial support member opening 54. The aperture has a diameter slightly greater than the outer diameter of the vertical members 30.

In an exemplary embodiment, associated with each opening 54 is an expansion slot 56. In the representative embodiment shown in FIGS. 7 and 8, the expansion slot is L-shaped having a leg portion 60 extending radially from the aperture and a back portion 58, spaced apart from the longitudinal axes of the apertures, extending from the leg portion to the back surface 38 of the cross brace. A threaded bore (not shown) extends from the back surface past the leg portion and an expansion slot screw 62 (FIG. 9) with a mating thread inserted in each pair of bores. When the screws are loosened the braces can be positioned along the length of the support member. When the screws are tightened, the brace is secured to the support member. In some embodiments, a second threaded bore (132 shown) is formed from the back surface of the upper cross brace through to the attachment aperture and a second fastening screw 66 (FIG. 9) with a mating thread inserted in each bore. When the screws are loosened the braces can be positioned along the length of the support member. When the screws are tightened, the brace is secured to the support member.

In the embodiment shown for example, in FIGS. 7 and 8, the top cross brace 26 and the bottom cross brace 28 each contain two spaced apart support member attachment apertures 54 to accommodate two support members 20. However, in alternate embodiments, by varying the number of support member attachment apertures the number of support members can be changed. For example, in the embodiment shown in FIG. 9, a back perspective view of a second embodiment of a support frame in accordance with the invention, the top cross brace and the bottom cross brace each contain six support member attachment apertures and can accommodate six support members.

Figure 10:
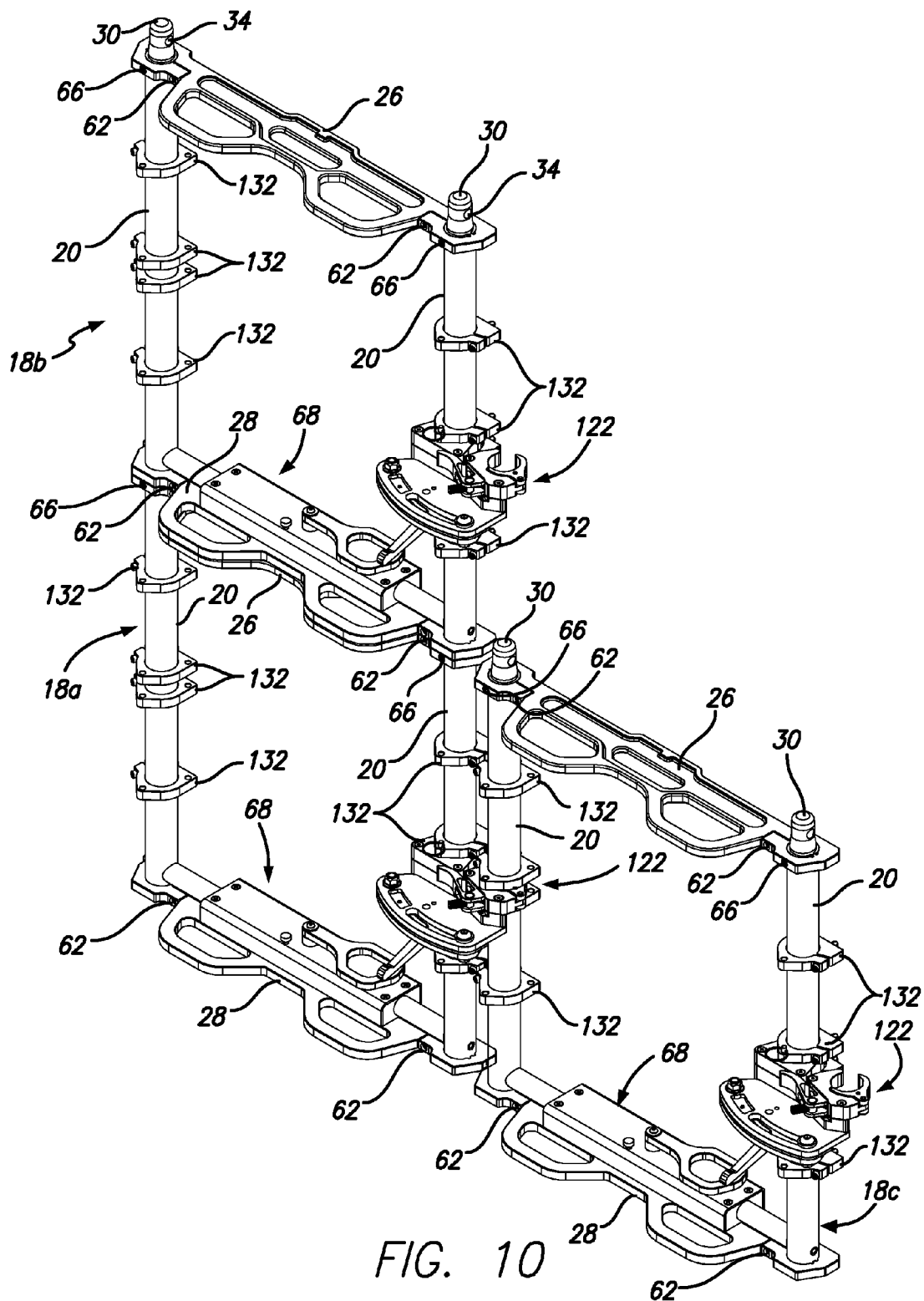
FIG. 10 a back perspective view of a plurality of support frames in accordance with the invention secured to one another.
Figure 11:
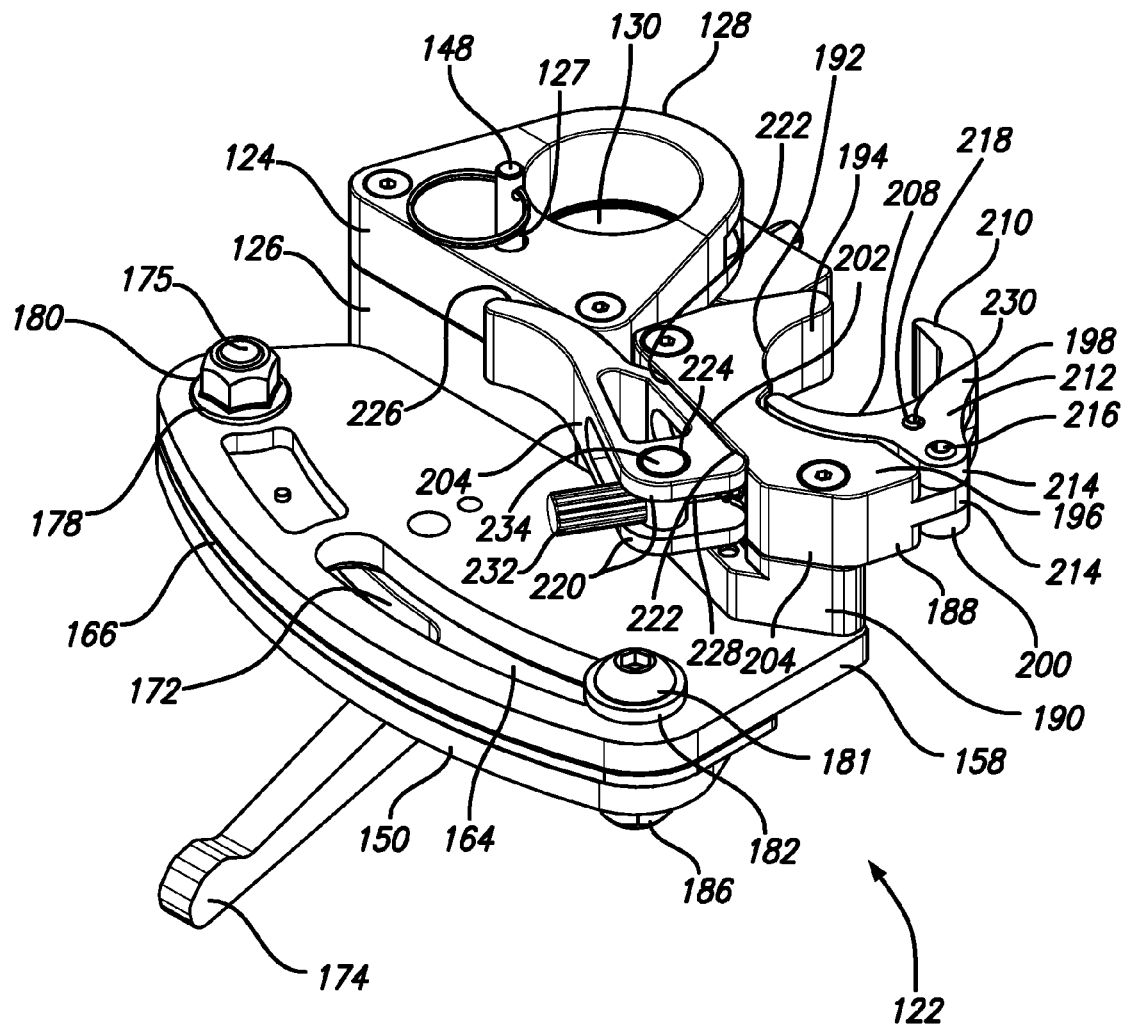
FIG. 11 is a perspective view of a vertical locking assembly in accordance with one aspect of the invention.

It is a distinct advantage of the invention that single support frames 18 can be attached with additional support frames in both vertical and horizontal directions. FIG. 10 is a back perspective view of a plurality of support frames in accordance with the invention secured to one another. In the embodiment of FIG. 10, a first support frame 18a is attached to a second support frame 18b to extend the video display system in the vertical direction and a third support frame 18c is attached to the first support frame to extend the LED display system in the horizontal direction. While three support frames are shown in FIG. 10, it can be appreciated that video display of any desired configuration can be constructed by connecting one or more additional support frames to support frame 18a as well as each additional support frame.

An exemplary vertical locking assembly 68 mounted on the lower cross brace 28 for fastening the support frame 18a to the support frame 18b is best understood with reference to FIGS. 5, 5A and 5B. The locking assembly includes a center cover plate 70 secured to the second cross member 28. The center cover plate has first and seconds and a bearing block 76, containing sleeve bushing 77, capping each end. A pair of opposing lock spring covers 78 extends from each bearing block to each support member opening 54, such that the lock spring covers abut a support member 20.

Figure 6:
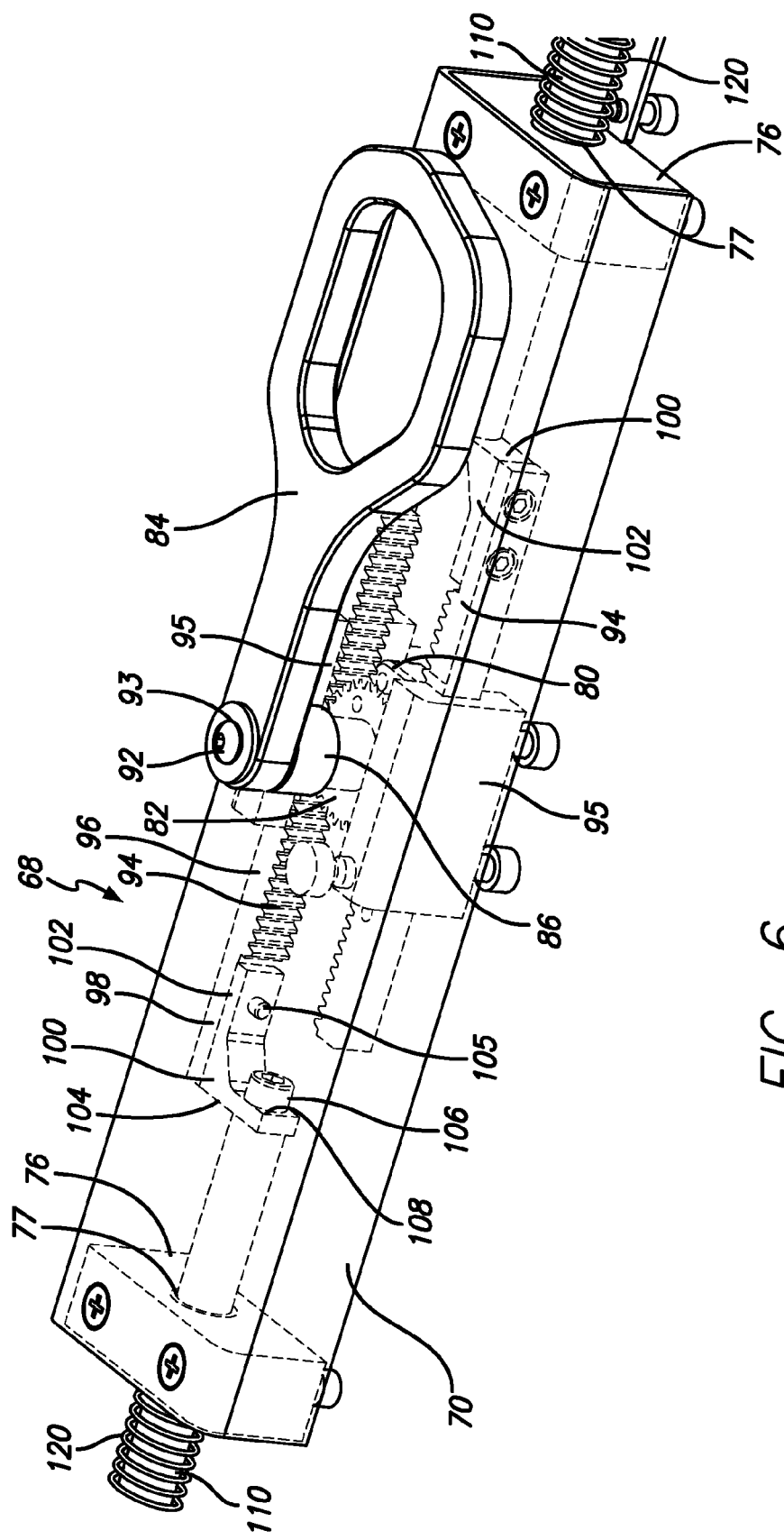
FIG. 6 a back perspective view of a portion of the locking assembly

Referring additionally to FIG. 6, a back perspective view of a portion of the locking assembly, supported on a pivot block 80 is a tooth and pinion gear 82. A lock handle 84 movable between unlocked (FIG. 5A) and locked (FIG. 5B) positions is operatively connected to the tooth and pinion gear by a handle block 86. As best seen in FIG. 5, in a representative embodiment, a pivot screw 88 extends from a pivot block washer 90 through the pivot block and into one end of the handle block to secure the pivot block to the handle block. A handle screw 92 extends though a handle screw washer 93 into the opposing end of the handle block to secure the handle to the handle block.

First and second opposing linear gear racks 94 are supported by rack slides 95 disposed against front and back interior surfaces of the center cover plate. The gear racks contain a first portion 96 having complimentary teeth for engaging the tooth and pinion gear. A second portion 98 contains a recess for receiving an L-shaped lock pin rack connector 100 having a back 102 and an arm 104. The back is secured to the recess, for example by a screw 105. The arm extends inwardly with a screw hole 108 disposed at its distal end.

A pair of opposing lock pins 110 each has a first end portion 112 and a second end portion 114. The first end portion contains a threaded bore 116 aligned with the lock pin rack connector screw hole 108 for receiving a lock pin connector screw 106. The second end portion has a diameter slightly smaller than the diameter of the lock pin openings 36. Spaced apart from the second end is a stop flange 118. Each lock pin extends from the lock pin rack connector through the sleeve bushing 77 in bearing block 76 and through a lock pin spring 120. One end of the lock pin springs abuts the bearing block and the opposing end abuts the stop flange.

When the handle 84 is in the closed position (FIG. 5A), the second end 114 of each lock pin 110 is withdrawn entirely within the lock spring covers 78. When the handle is moved to the locked position, it causes the lock pins to extend through the lock pin receiving openings 36 until the stop flange 118 rests against a support member 20.

As seen in FIGS. 5A and 5B, when a locating pin 30 on the second support frame is inserted in the bottom end 24 of the support member 20 on the first support frame, the lock pin receiving bore 34 aligns with the lock pin receiving openings 36 so that the lock pin 110 extends through both the bore and the openings to secure the second support frame to the first.

A horizontal locking assembly 122 mounted on one of the vertical members horizontally fastens support frame 18b to support frame 18c. In some aspects, the horizontal locking assembly is pivotable so that the angle formed by adjacent LED tiles can be varied. As seen for example, in FIG. 11, a perspective view of the horizontal locking assembly, some embodiments of such aspects include a pivot member 124 with a pivot member body 126. An alignment pin bore 127 extends from the top to the bottom of the pivot member body. Extending outwardly from the front of the top of the body is support member attachment portion 128. The support member attachment portion contains a support member attachment opening 130 having a diameter that is substantially the same as the outer diameter of the support member.

Figure 3:
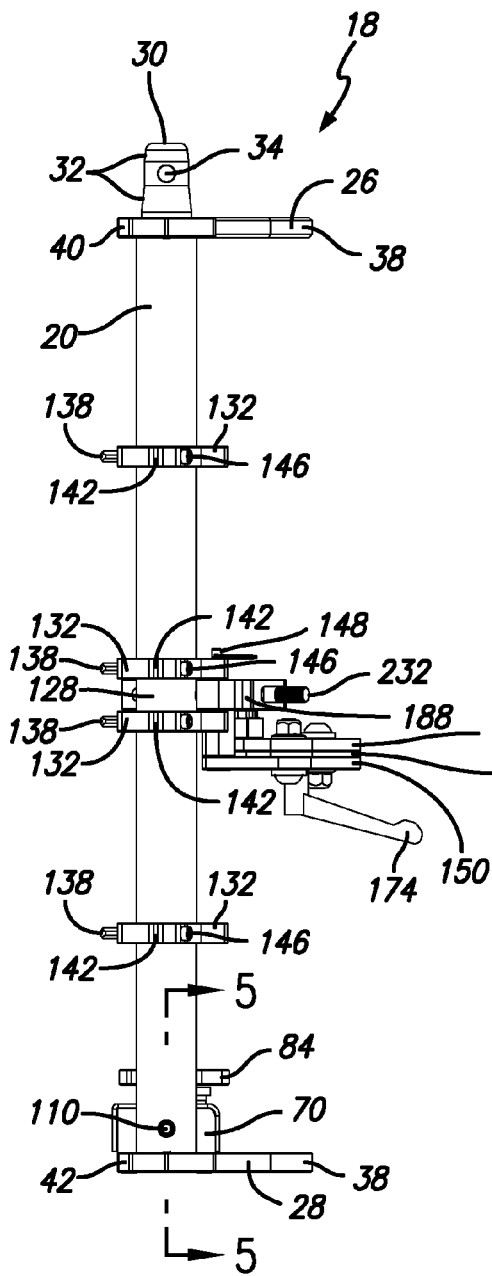
FIG. 3 is a side plan view of the support frame of FIG. 2.
Figure 4:
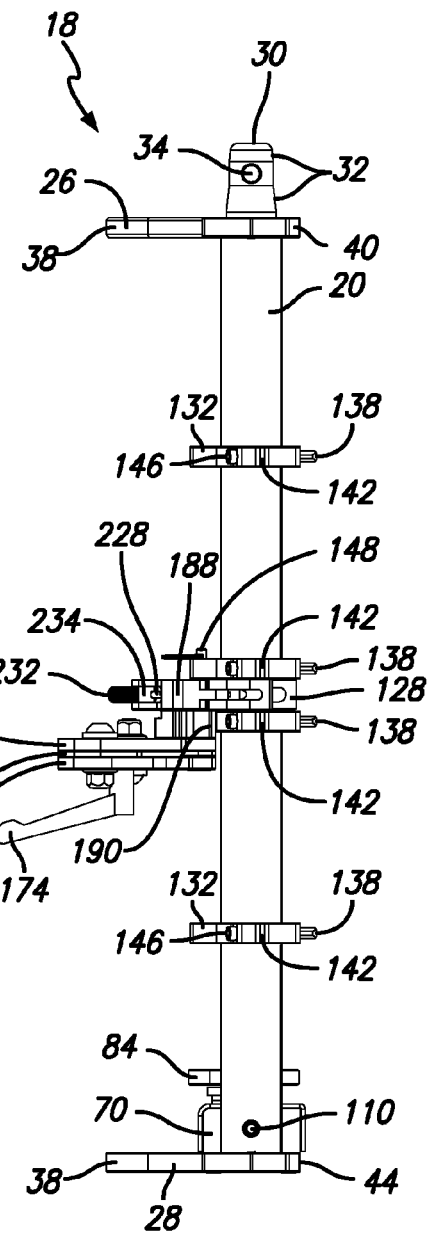
FIG. 4 is an opposing side plan view of the support frame of FIG. 3.

As best seen in FIGS. 1, 3 and 4, the horizontal attachment assembly 122 is fastened to the support frame 18 by sliding the support member attachment portion 128 onto a support member 20 between two support member collars 132. In the embodiment shown in FIG. 1, each support member collar includes a support member collar attachment aperture 134. The aperture has a diameter that is slightly larger the outer diameter of the vertical member, so that the video support member collar can be positioned on the support member by sliding the video support member collar up and down the support member.

One side of the collar 132 contains a substantially planar attachment plate contact surface 136 having a first portion and a second portion. Extending outwardly from the first portion of the attachment surface is an attachment peg 138. A vertically aligned attachment plate attachment bore 140 is disposed in the second portion. A vertically aligned horizontal locking assembly attachment bore 141 is disposed on a surface of the collar opposing the contact surface.

In some embodiments, the collar 132 includes an expansion slot 142, for example an expansion slot oriented parallel to the contact surface 136 and extending from a side of the collar to the attachment aperture 134. A threaded bore (not shown) extends from one side of the collar past the expansion slot 142. An expansion slot screw 146 (FIGS. 3 and 4) with a mating thread is inserted through the bore. When the screw is loosened the collar can be positioned along the length of the support member. When the screw is tightened, the collar is secured to the support member. Alignment of the horizontal attachment assembly 122 and the two video support member collars 132 is achieved by aligning the alignment pin bore 127 with the attachment plate attachment bore and inserting an alignment pin 148.

Referring additionally to FIG. 8, extending outwardly from the back of the bottom of the pivot member body 126 is a lower pivot plate 150. The lower pivot plate contains an arcuate first pivot screw slot 152, an arcuate handle slot 154 and a first first pivot screw opening (not shown) though the surface of the lower plate.

Referring additionally to FIG. 7, disposed on top of the lower pivot plate 150 is an upper pivot plate 158. The upper pivot plate contains a second first pivot screw opening (not shown) aligned over the first pivot screw slot 152, a first handle pin opening (not shown) aligned over the handle slot and an arcuate first second screw slot 164 oriented over the second pivot screw opening.

In some embodiments, the horizontal attachment assembly 122 includes a pivot wear plate 166 (FIG. 2) Interposed between the lower and upper pivot plates, 150, 158. The pivot wear plate includes an arcuate second second screw slot, aligned with the first second screw slot, a second first screw opening aligned with the first first pivot screw opening and a second handle pin opening 172, aligned with the first handle pin opening.

A horizontal attachment assembly handle 174 having an attachment pin extending upwardly at one end is located beneath the lower pivot plate 150 with the pin extending up through the handle slot 154 and the second handle pin opening 172. A first pivot screw 175 extends through a first pivot bearing 176 disposed in the first pivot screw slot 152, a bearing washer disposed in the second first pivot screw opening 156 and then the first first pivot screw opening. It is fastened with a first pivot screw washer 178 and nut 180. A second pivot screw 181 extends through the a second pivot bearing 182 disposed in the first second pivot screw slot 164, a second bearing washer 183 disposed in the second second pivot screw slot and the first second pivot screw slot 164. The second screw is fastened with a second pivot screw washer 184 and nut 186.

In some embodiments, a second video support member mount 188 is secured to the top surface of the upper pivot plate 158 with a hinge spacer 190. The hinge plate mount contains a contoured front surface 192. A first portion 194 of the front surface has a curvature corresponding to a portion the outer surface of the support member 20. A second portion 196 of the front surface corresponds to the curvature of one side of a switch plate 198 and terminates in a hinge 200 extending outwardly from the center of the second portion. The back of the hinge pipe mount contains a planar surface 202 configured to abut a swivel plate lock 204 and contains an eye bolt bore (not shown).

The swivel plate latch 198 is of a generally wishbone shape and is pivotable between open and closed positions. The interior surface 208 of a first portion of the wishbone has a hemispherical cross section with a diameter substantially the same as the diameter of the support member 20. The exterior surface 210 of the first portion corresponds to the curvature of the second portion 196 of the front surface 192, so that when the swivel plate latch is in the closed position the front surface and the interior surface form a substantially continuous curve having a diameter substantially the same as the outer diameter of the support member 20. A second portion of the wishbone comprises a pair of spaced apart flanges 212. The flanges end in hinges 214 that mate with hinge 200 and are secured to hinge 200 with a hinge pin 216. A vertical eye bolt fastening bore 218, aligned with the axis of the eye bolt bore extends through flanges.

The swivel plate lock 204 contains a first portion comprising two horizontally spaced apart flanges 220. The front surfaces 222 of the flanges are substantially straight and are configured to abut the planar back surface 202 of the hinge pipe mount 188. A pair of aligned clevis pin openings 224 are formed through the flanges. The second portion of the swivel plate lock is a curved contact surface 226 that abuts the pivot member body 126.

The eye of an eyebolt 228 is secured to the swivel plate latch 198 by an eye bolt pin 230 inserted through eye bolt bore fastening bore 218. The eye bolt extends from the swivel plate latch 198, through the eyebolt bore 206 and between the between the flanges 220. A swivel plate adjuster nut 232 extends through a clevis pin 234 inserted through clevis pin openings 224 and attached to the eyebolt. When the adjuster nut is rotated in one direction it causes the swivel plate latch to open and be in a position to receive a support member from support frame 18a. When the adjuster nut is rotated in the other direction, it causes the swivel plate latch to close and secures support frame 18a to support frame 18b.

Figure 12:
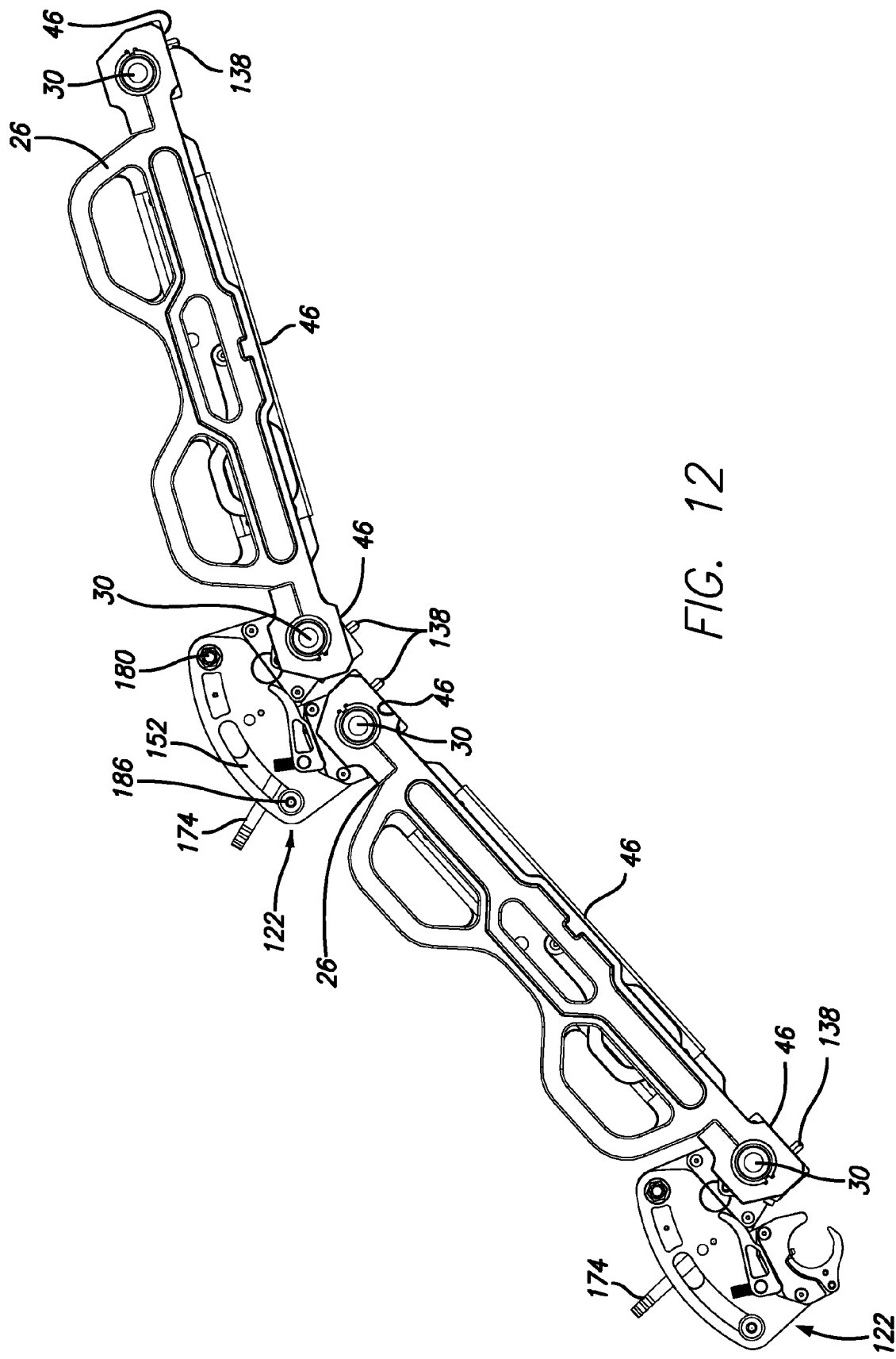
FIG. 12 is a top plan view of two support frames in accordance with the invention secured to one another.

It is an added advantage of the invention that the angle formed by support frames can be adjusted. As shown in FIG. 12, a top plan view of two horizontally attached support frames, when the first and second pivot screw nuts 180 and 186 are loosened, handle 174 can be moved along the first second pivot screw slot 152 to cause the hinge pipe mount and the swivel plate latch to move to a selected angle. When the nuts are tightened the adjacent support frames are secured in the desired position.

Figure 13:
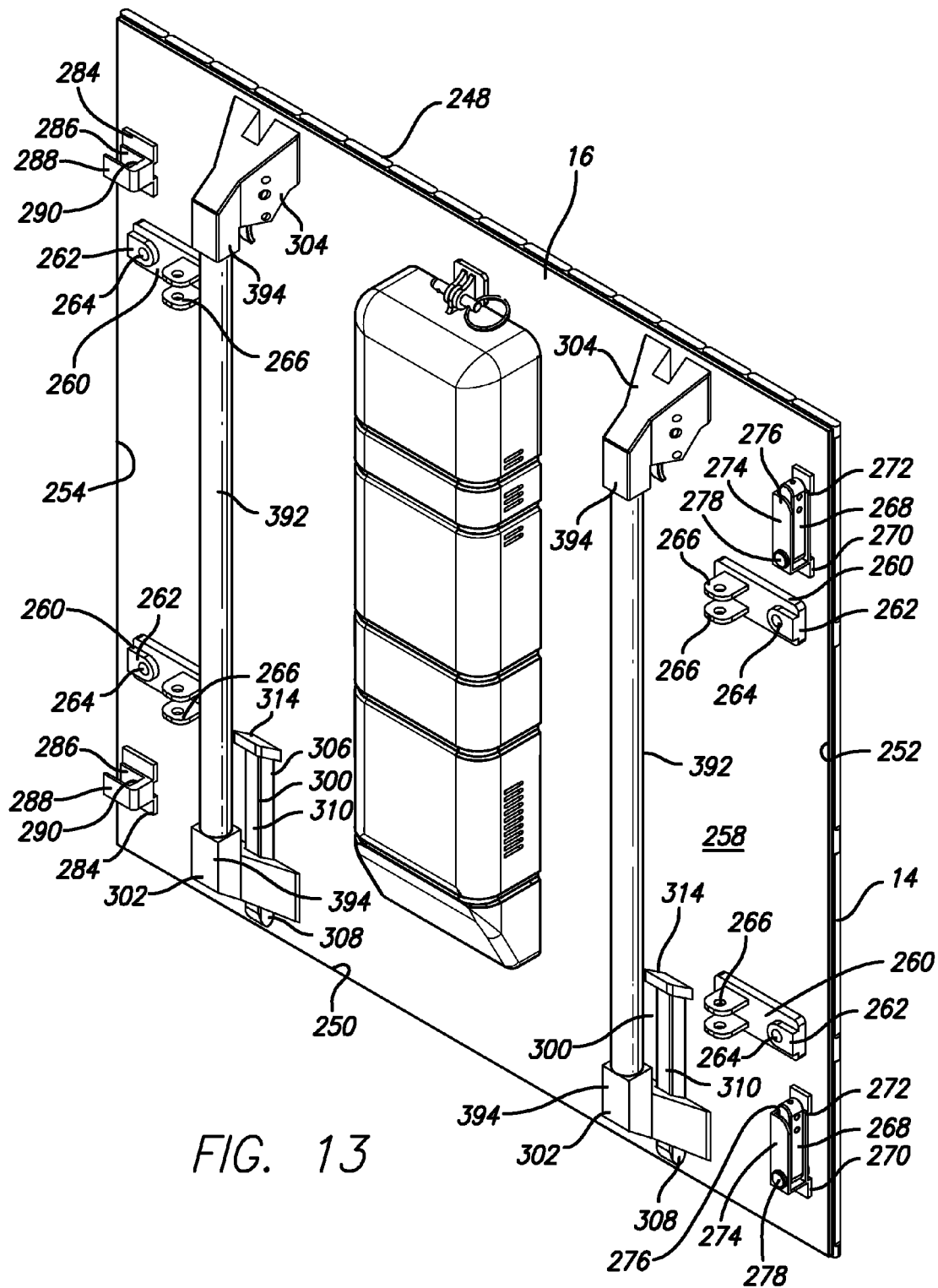
FIG. 13 is a back perspective view of a attachment plate in accordance with one aspect of the invention.

The attachment plate 16 is illustrated in FIGS. 1 and 13, front and back plan views of an attachment plate in accordance with one aspect of the invention. The attachment plate includes a front side (FIG. 1) comprising top 248, a bottom 250 and opposing sides 252 and 254, along with a front surface 256 for interfacing with the LED tile 14 and a back side (FIG. 13) with a back surface 258 for interfacing with the support frame 18.

The attachment plate can be attached to the support frame by any suitable means. In some embodiments, the attachment plate is removably attached to the support frame. In the embodiment shown, for example, in FIG. 13, the back surface includes four support frame connectors 260, each connector for mating with a support collar 132 (FIGS. 1 and 22).

Figure 22:
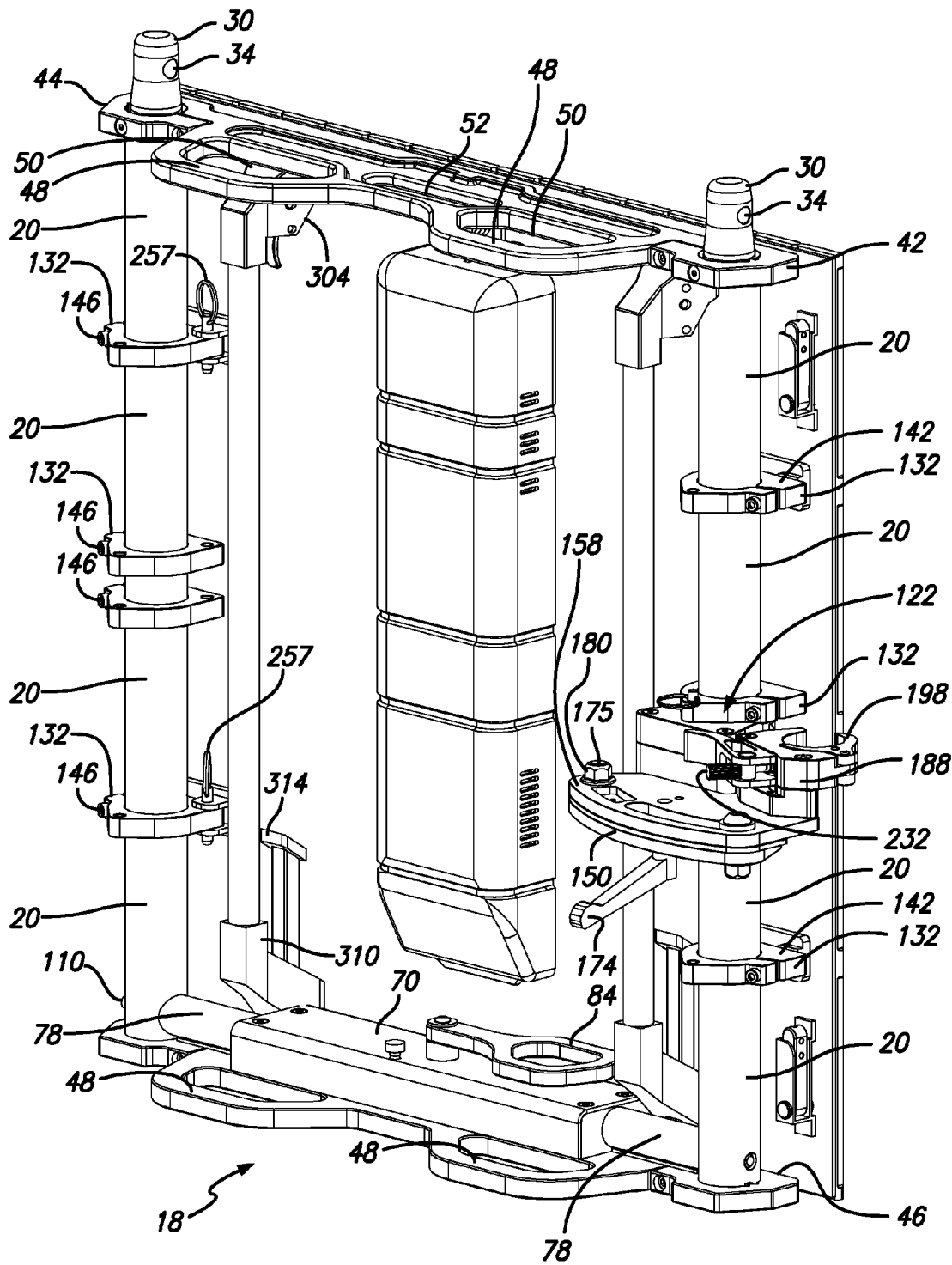
FIG. 22 is a back perspective view of a video display module in accordance with one aspect of the invention.

As best seen in FIG. 22, the horizontal distance between the connectors 260 is the same as the distance between the collars 132 on the support members 20 in the support frame 18. The vertical distance between connectors is a matter of design choice, as the collars are movable up and down the support members in order to align with the connectors.

Each connector 260 has a first portion and a second portion. The first portion includes a substantially planar support member collar contact surface 262 that abuts the support member contact surface 136 (FIG. 1). An attachment peg bore 264 for receiving the attachment peg 138 (FIG. 1) is disposed in the contact surface. A pair of vertically spaced hinge flanges 266 is disposed on the second portion. The spacing between the flanges is slightly greater than the height of the collar 132 and the spacing between the bore and the flanges is the same as the spacing between the peg and the support attachment bore 140, so that when the peg is inserted in the peg bore, the hinge flanges are aligned with the attachment bore. A removable quick release pin 267 not shown) inserted through the hinge flange and bore, secures the connector to the collar and the attachment plate 16 to the support frame 18.

Figure 14:
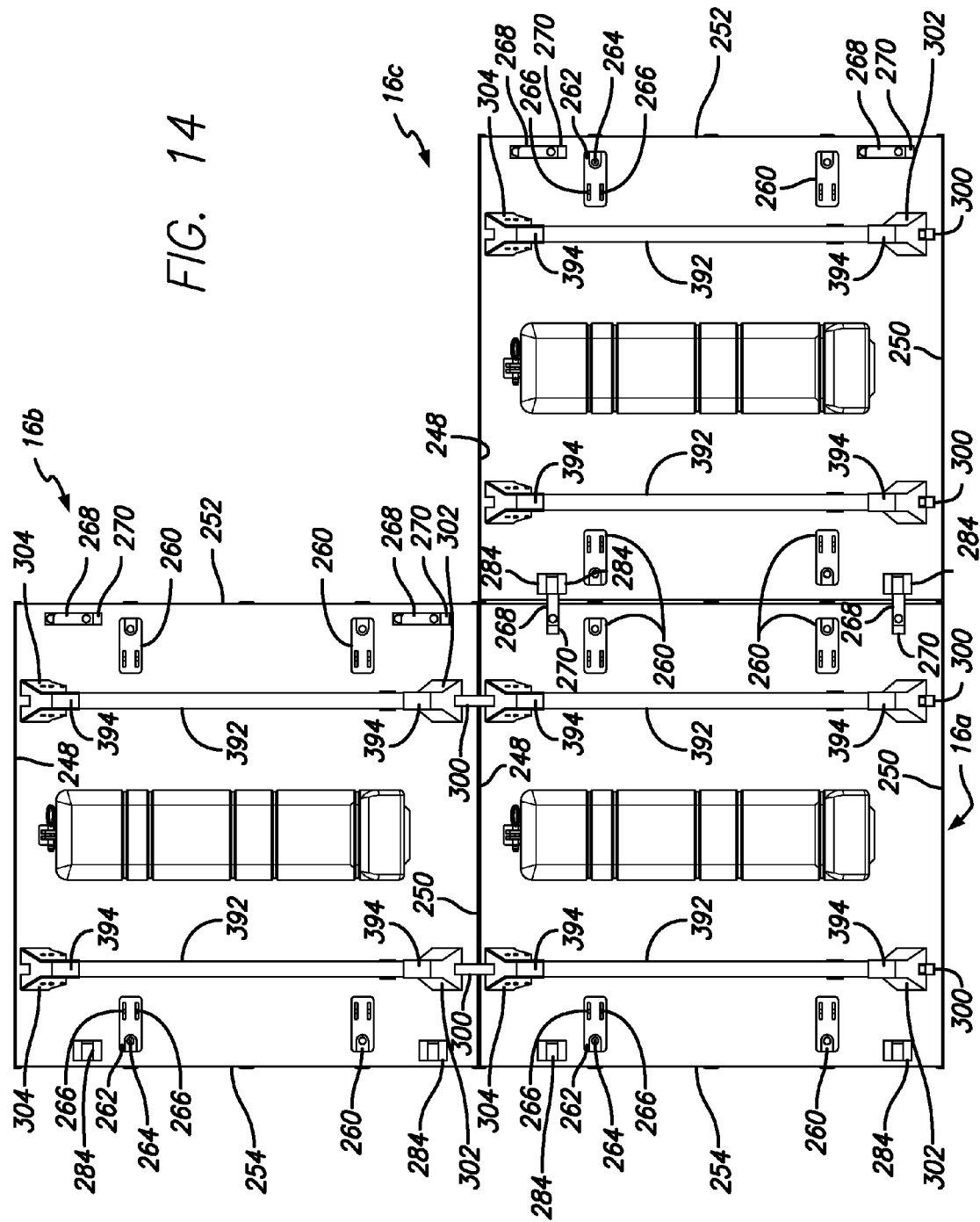
FIG. 14 is a back plan view of a plurality of attachment plates in accordance with the invention secured to one another.

It is a distinct advantage of the invention that the attachment plate 16 can be attached to additional attachment plates in both vertical and horizontal directions. FIG. 14 is a back plan view of a portion of one embodiment of a video display system in accordance with the invention. In the embodiment of FIG. 14, a first attachment plate 16a is attached to a second attachment plate 16b to extend the video display system in the vertical direction and a third support frame 16c is attached to the second support frame to extend the video display system in the horizontal direction. While three attachment plates are shown in FIG. 14, it can be appreciated that a video display of any desired configuration can be constructed by connecting one or more additional attachment plates to attachment plate 16a as well as each additional attachment plate.

In some aspects of the invention, horizontally adjacent mounting panels are attached to one another with an attachment means and, in some embodiments, releasably attached to one another. In the embodiment shown in FIGS. 13 and 14, a releasable horizontal attachment means includes a pair of vertically spaced apart latches 268 movable between a horizontal latched and a vertical unlatched position. The latches are located near the top 248 and bottom 250 of the back surface 258, respectively, adjacent one side 252.

Each latch 268 is secured to the back surface 258 with a latch support 270 having a front wall 272 and a back wall 274 spaced part a distance substantially equal to the width of the latch, and a side wall 276, against which the latch abuts, when the latch is in the unlatched position. A pivot pin 278 that extends through aligned a latch pivot pin opening and latch support pivot pin openings pivotally secures the latch to the latch support.

A pair of vertically spaced apart latch holders 284, each spaced apart the same distance as the pivot pins 278, is located near the top 248 and bottom 250 of the back surface 258, adjacent the opposite side 254, respectively. Each latch holder 284 has a front wall 286 and a back wall 288, spaced part from one another a distance substantially equal to the width of the latch 268, and a side wall 290, against which the latch 268 abuts, when the latch is in the open position. The distance between the latch support, the latch holder and the length of the latch is such that the distal end of the latch 268 rests in the latch holder and abuts the side wall when the latch is pivoted into the latched position.

It is another distinct advantage of the invention that in some embodiments, the vertically adjacent mounting panels are attached to one another and, in some embodiments, releasably attached to one another by a vertical mounting assembly. As seen in the embodiment shown in FIGS. 13 and 14, a vertical attachment means includes a mounting arm 300, movable between unsecured and secured positions, slidably supported in a mounting arm support 302. When extended, the mounting arm is secured in a mounting arm ratchet assembly 304. In some embodiments. The mounting arm is releasable using a trigger mechanism.

Figure 15:
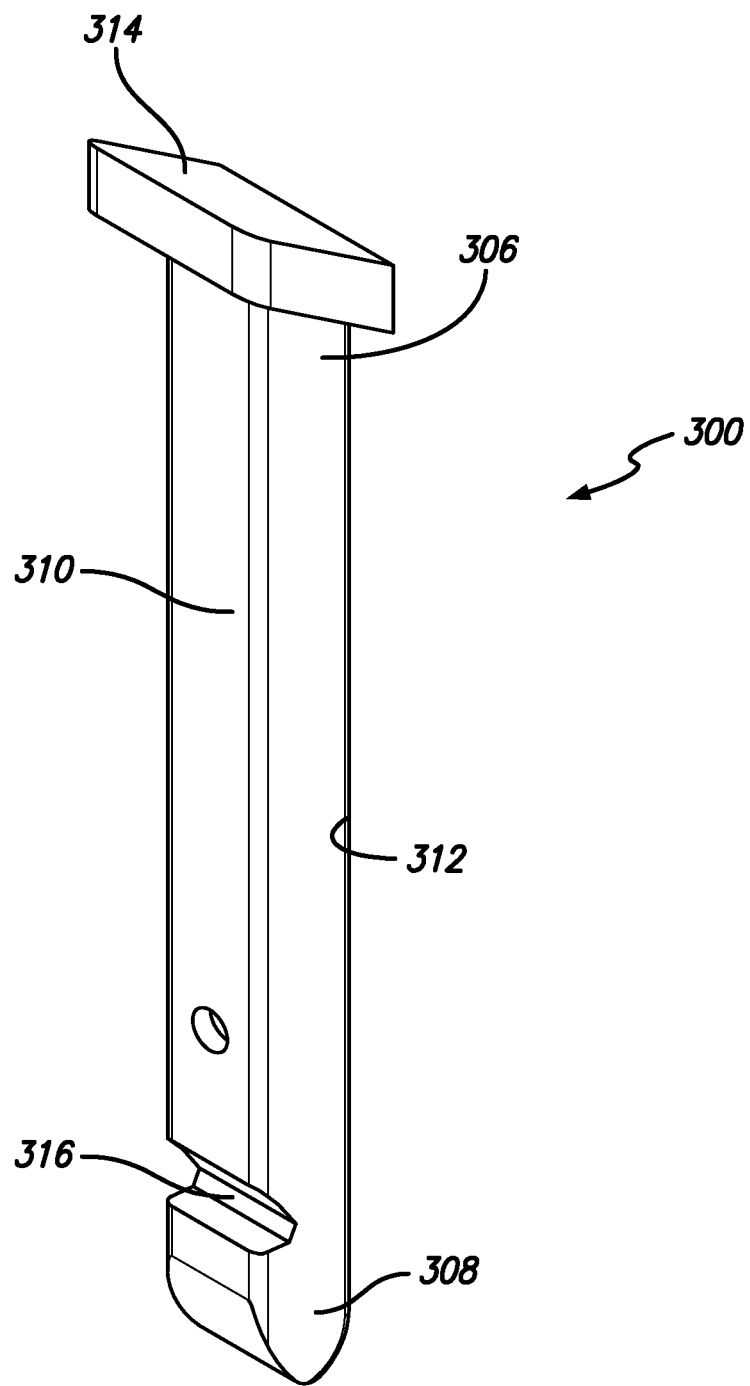
FIG. 15 a back perspective view of a mounting arm in accordance with one aspect of the invention.

Turning additionally to FIG. 15, a perspective view of a mounting arm in accordance with one aspect of the invention, the mounting arm is generally spike-shaped, with a top 306, a bottom 308, a back side 310 and a front side 312. While the arm may have any suitable cross section, such as a circular or oval or polygonal cross section, in an exemplary embodiment, the arm has a rectangular cross section. As best seen in FIG. 15, the head of the spike 314 extends rearwardly outwardly form the top of the spike and a transverse notch 316 cuts across the back of the spike adjacent to its bottom.

In the exemplary embodiment of FIGS. 13 and 14, a pair of vertically spaced mounting arm supports 302 is mounted near each side of the attachment plate 16, near its bottom 250. Interior sidewalls, along with an interior back wall and a portion of the back surface 258 of the attachment plate form a mounting slot. The mounting slot has a cross section that is substantially the same as the cross section of the mounting arm 300, such that the mounting arm is slidably supported in the mounting slot by the mounting arm support.

Figure 16:
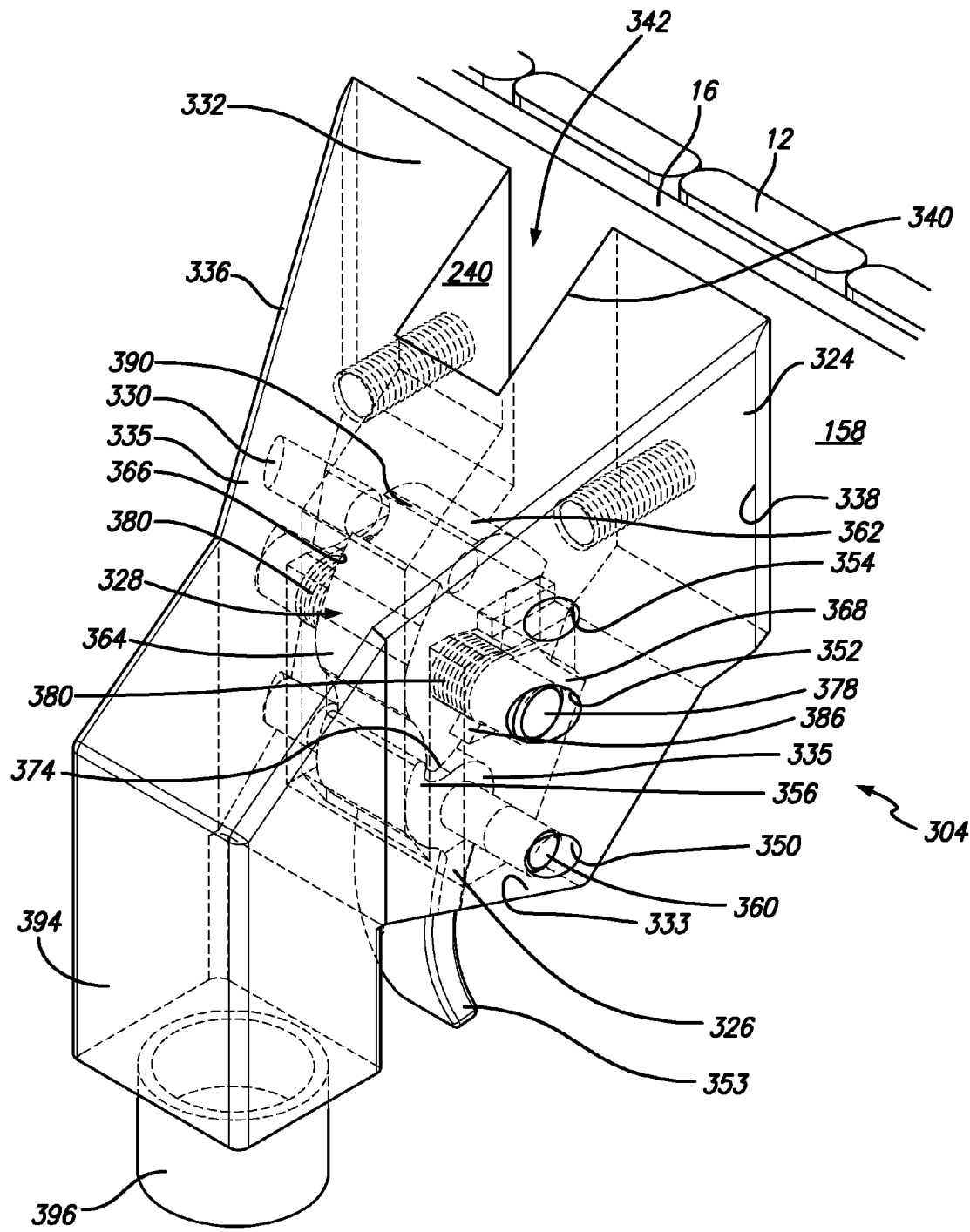
FIG. 16 a top perspective view of a mounting arm ratchet assembly in accordance with one aspect of the invention.
Figure 17:
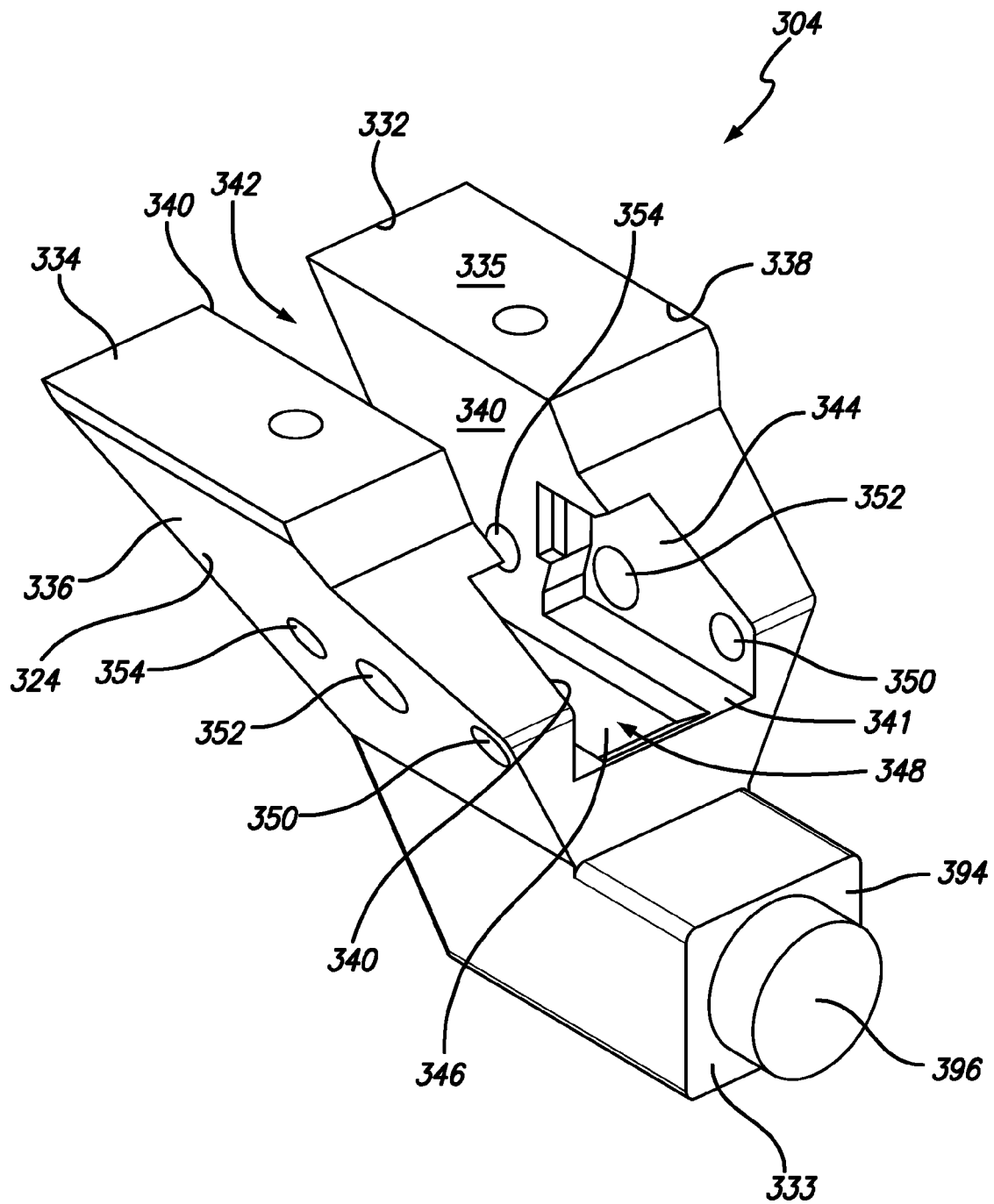
FIG. 17 a bottom perspective view of a mounting arm ratchet assembly housing in accordance with one aspect of the invention.

As best seen in FIG. 16, a top perspective view of an exemplary mounting arm ratchet assembly 304 and FIG. 17, a front perspective view of the mounting arm ratchet assembly, the ratchet assembly includes a housing 324 for a pivotable trigger member 326, a pivotable ratchet body 328 and a lock pin 330. The housing has a top 332, a bottom 333, a front 334, a back 335 and opposing sides 336 and 338. Interior housing sidewalls 340, along with a portion of the back surface 158 of the attachment plate form a mounting arm slot 342 in the front of the housing. The mounting arm slot has a cross section that is substantially the same as the cross section of the mounting arm 300, such that the mounting arm is slidable in the mounting arm slot.

Each interior sidewall 340 contains a portion having an increased diameter 344 extending from the bottom 333 and back 335 of the housing and an interior back wall 341 contains a recessed portion 346 adjacent the bottom of the housing. Together, a chamber 348 for housing the trigger member 326 and the pivotable ratchet body 328 is formed in the back of the housing 324. Extending through the opposing side walls of the housing are a pair of aligned housing trigger member pivot pin bores 350, a pair of aligned housing ratchet body bores 352 and a pair of lock bores 354.

Figure 18:
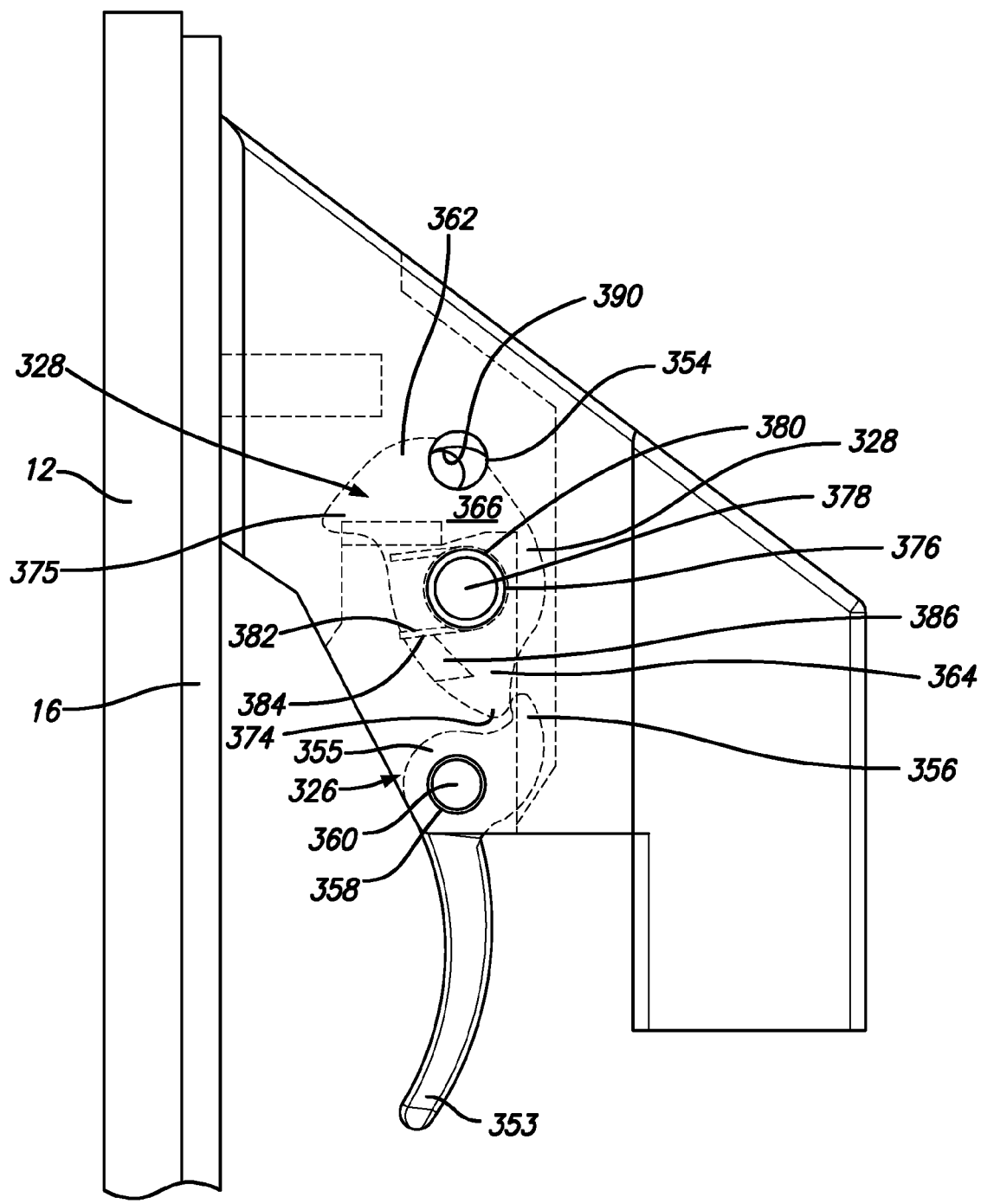
FIG. 18 a side plan view of a portion of the mounting arm ratchet assembly of FIG. 16.

As best seen in FIGS. 16 and 18, a side plan view of a portion of the mounting arm ratchet assembly including the trigger member, in an exemplary embodiment, the trigger member 326 has a lower and an upper portion. The lower portion comprises a trigger 353 and the upper portion comprising a trigger member body 355 that includes a ratchet tooth 356 and a transverse trigger member pivot pin bore 358. The trigger member pivot pin bore aligns with the housing trigger member pivot pin bores 350, so that the trigger member is pivotably fastened to the housing 324 by a trigger member pivot pin 360 that extends through all the bores.

In some embodiments, the ratchet body 328 includes a top portion 362, a bottom portion 364 and opposing sides 366 and 368. The bottom portion comprises a trigger member tooth 374 that mates with the ratchet tooth 356 when the ratchet assembly 304 is in the engaged position shown in FIGS. 16 and 18.

A transverse ratchet body pivot pin bore 376 aligns with the housing ratchet body pivot pin bores 352, so that the ratchet body 328 is pivotably fastened to the housing 324 by a ratchet body pivot pin 378 that extends through all the bores. A pair of coil springs 380 are located on the ratchet body pivot pin adjacent each of the opposing sides 366, 368 of the ratchet body. As best seen in FIG. 18, each coil spring has a coil spring arm 382 that abuts a planar stop surface 384 of a pair of spring coil flanges 386 extending outwardly from each of the side to maintain the position of the coil springs when pressure is applied to engage the mounting assembly 304.

Extending from the front of the top portion 376 of the ratchet body 328 is a mounting arm tooth 375 that mates with the mounting arm notch 316 when the ratchet body is in the engaged position. Extending from the back of the top portion is a transverse lock notch 390. When the ratchet body is in the engaged position, the transverse lock notch is aligned with the ratchet body lock bores 354. The lock pin 330 can be inserted through the lock bores in order to lock the ratchet assembly 304 in the engaged position. The lock pin can be made of any suitable material and, in some embodiments; it is made of a carbon composite material.

Returning to FIGS. 13, 14 and 22, in some embodiments, the attachment plate 16 also includes at least one vertically oriented bar 392 to facilitate the handling of the attachment plate 16 and the assembly of the LED display system 10. Two vertically-spaced bars 392 are shown for each attachment plate in the exemplary embodiment of FIGS. 13, 14 and 22. The bar can have any suitable cross section, including without limitation, a circular or oval or polygonal cross section. In the embodiment shown in FIGS. 13, 14 and 22, the bars extend between aligned bar mounting portions 394 formed in the back 335 of each housing 324. As seen in FIGS. 16 and 17, in some embodiments, protruding downwardly from each bar mounting portion is a plug 396 shaped to fit in openings at the opposing ends of each bar.

Figure 19:
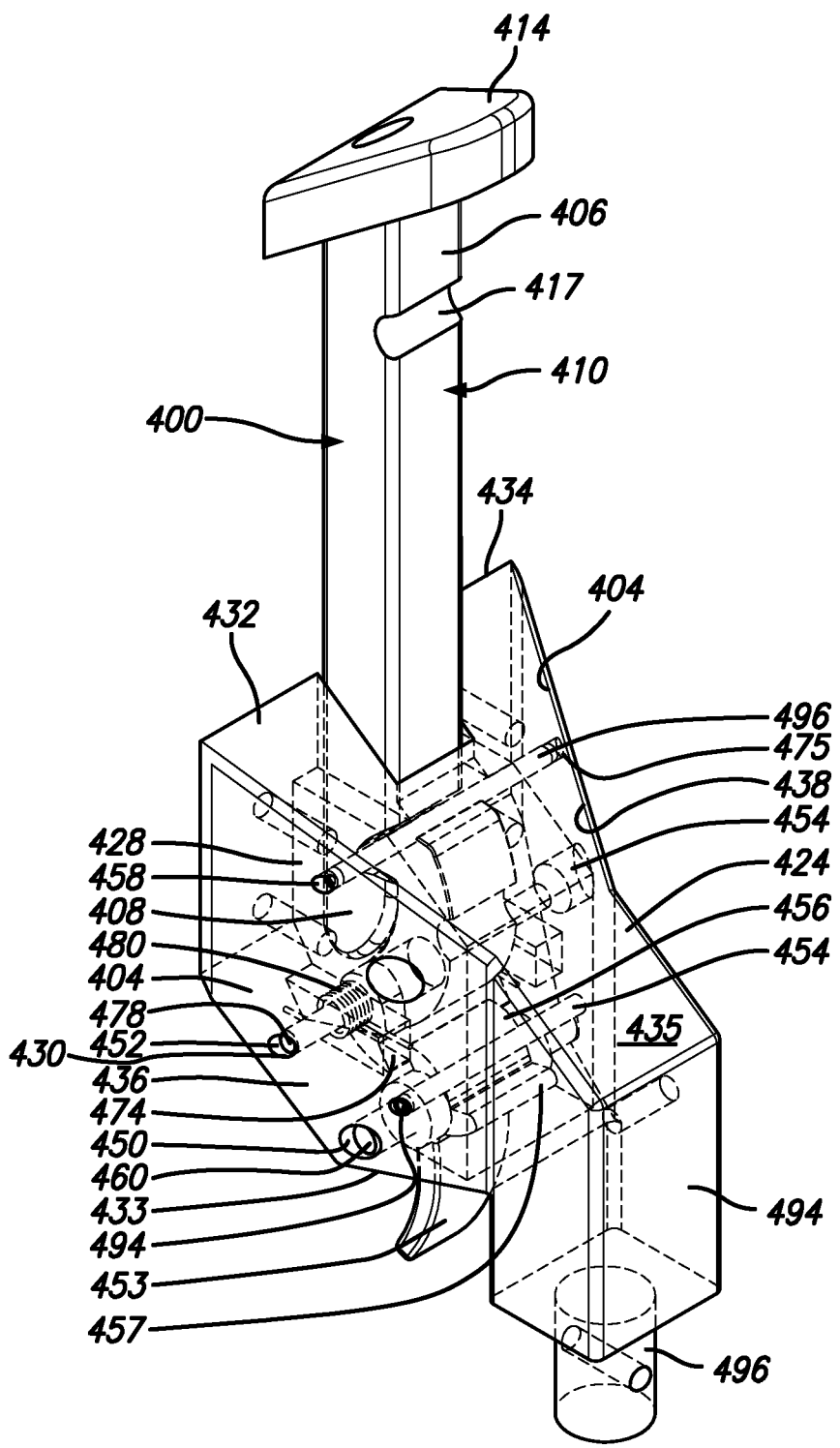
FIG. 19 is a side perspective view of a mounting arm and a mounting arm ratchet assembly in accordance with another aspect of the invention.
Figure 20:
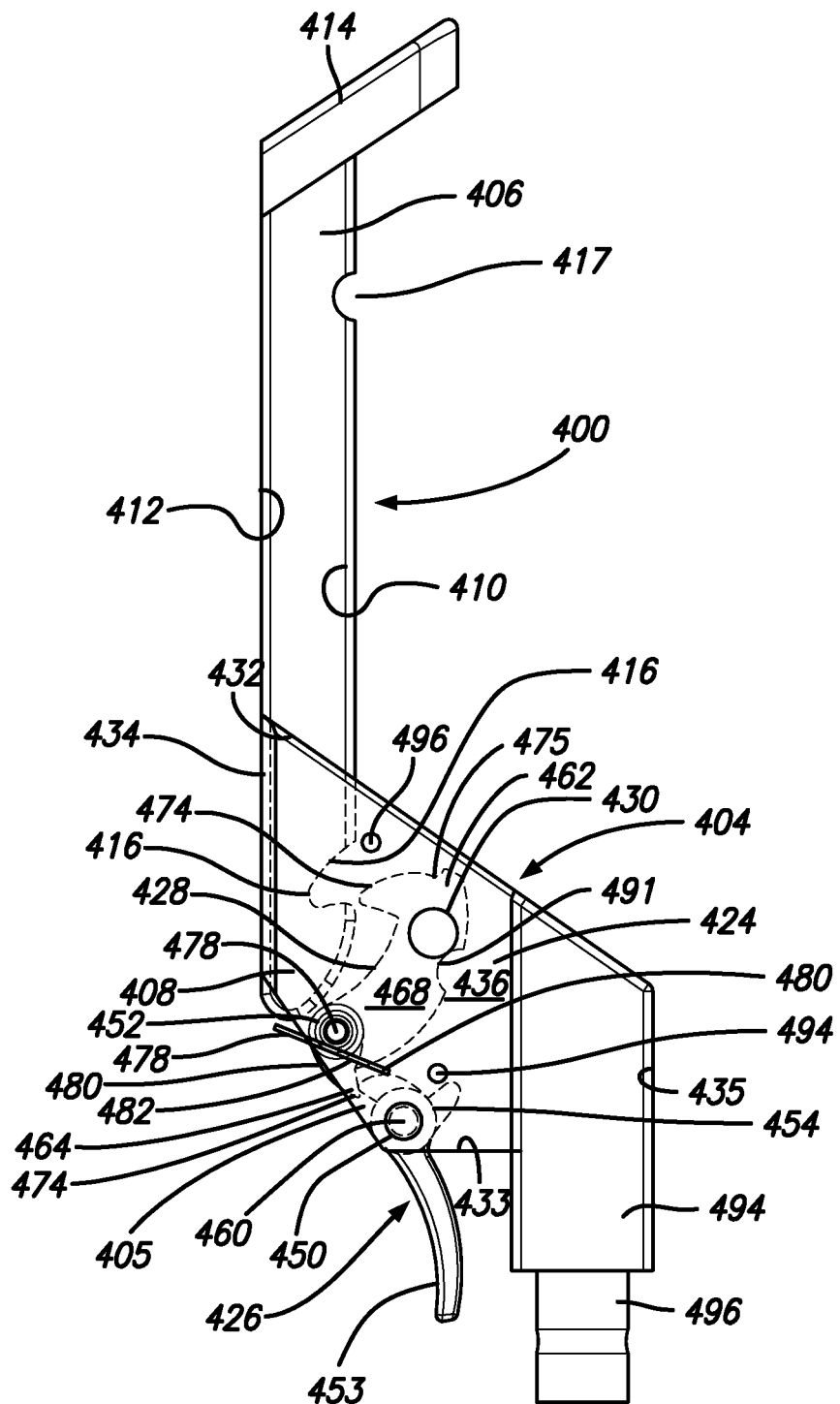
FIG. 20 is a side plan view of the mounting arm and mounting arm ratchet assembly shown in FIG. 19.
Figure 21:
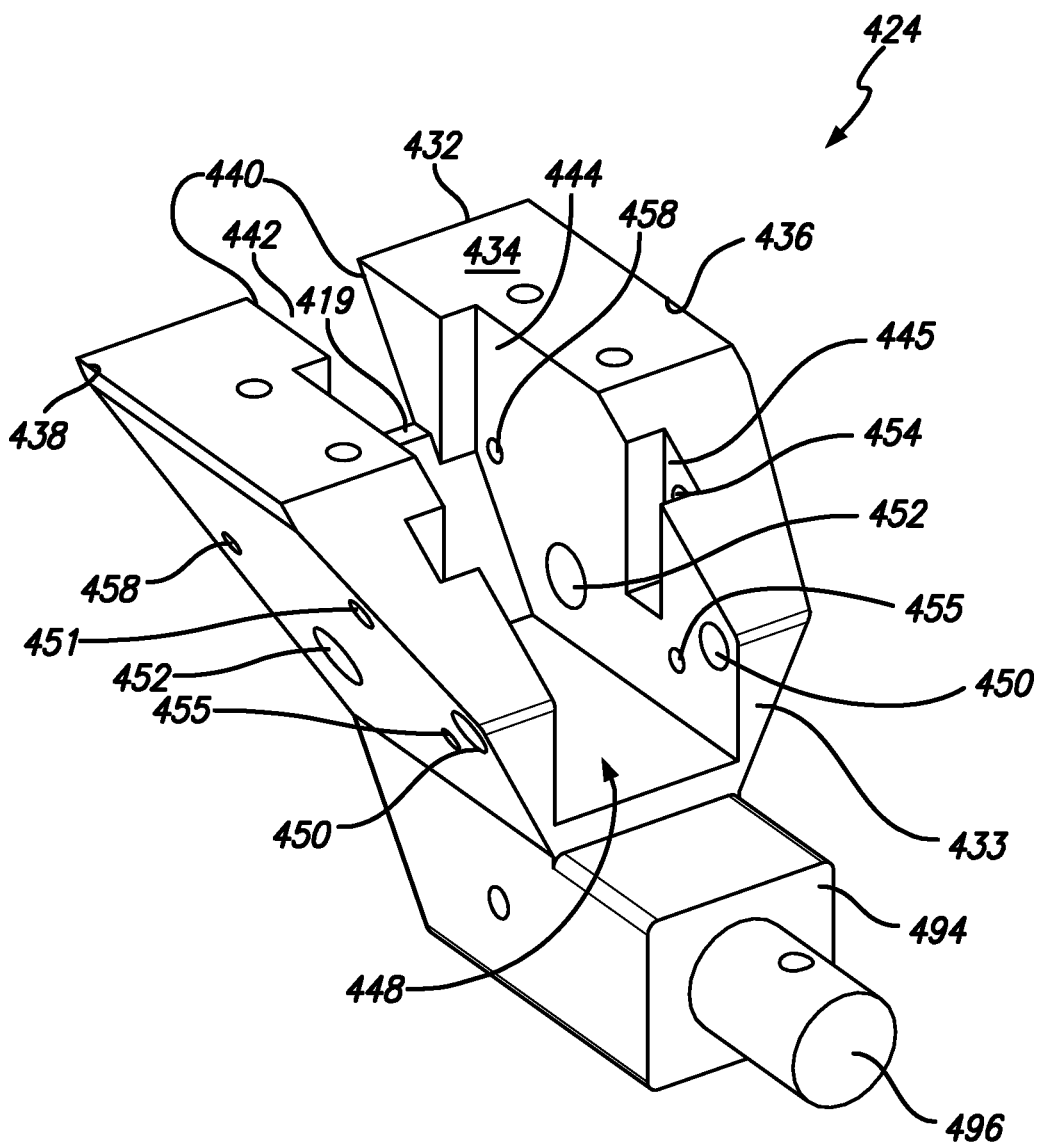
FIG. 21 is a bottom perspective view of a portion of the mounting arm and mounting arm ratchet assembly shown in FIG. 19.

Shown in FIG. 19, a side perspective view of a mounting arm and a mounting arm ratchet assembly, and FIG. 20, a side plan view of the mounting arm and mounting arm ratchet assembly, is a second embodiment of an exemplary mounting arm 400 and mounting arm ratchet assembly 404. The mounting arm has a generally spike shape, including a top 406, a bottom 408, a back side 410 and a front side 412. A head of the mounting arm 414 extends rearwardly outwardly form the top of the mounting arm, a first transverse notch 416 cuts across the back of the spike adjacent to its bottom and a second transverse notch 417 cuts across the back of the spike adjacent its top. When in the mounting arm is secured position, the second transverse notch engages a top edge 419 of a housing 424 (FIG. 21).

The mounting arm ratchet assembly 404 includes the housing 424 for a pivotable trigger member 426, a pivotable ratchet body 428 and a lock pin 430. Turning additionally to FIG. 20, the housing has a top 432, a bottom 433, a front 434, a back 435 and opposing sides 436 and 438. Interior housing sidewalls 440, along with a portion of the back surface of the attachment plate form a mounting arm slot 442 in the front of the housing. The mounting arm slot has a cross section that is substantially the same as the cross section of the mounting arm 400, such that the mounting arm is slidable in the mounting arm slot.

Each interior sidewall 440 contains a first portion having an increased diameter 444 extending inwardly from the bottom 433 and back 435 of the housing and a second portion 445 having a further increased diameter extending inwardly from back. Together, a chamber 448 for housing the trigger member 426 and the pivotable ratchet body 428 is formed in the back of the housing 424.

Extending through the opposing side walls 440 are a pair of aligned housing trigger member pivot pin bores 450, a pair of aligned housing ratchet body pivot bores 452, a pair of aligned lock bores 454, a pair of aligned trigger member stop bores 455 and a pair of aligned ratchet body stop bores 458. A trigger member pivot pin 460 extends through the trigger member pivot pin bores, a ratchet body pivot pin 478 extends through the ratchet body pivot bores, the lock pin 430 can be removably positioned between the lock pin bores, a trigger member stop pin 494 extends through the trigger member stop bores and a ratchet body stop pin 496 extends through the ratchet body stop bores.

As best seen in FIG. 19, in an exemplary embodiment, the trigger member 426 has a lower and an upper portion. The lower portion comprises a trigger 452 and the upper portion comprises a trigger member body 454. The trigger member body includes a transverse trigger member pivot pin bore. The upper front portion of the trigger member body includes a trigger member tooth 456 and the upper rear portion of the trigger member body includes a pivot member stop 457.

The trigger member pivot pin bore aligns with the housing trigger member pivot pin bores 450, so that the trigger member 426 is pivotably fastened to the housing 424 by a trigger member pivot pin 460 that extends through all the bores. The trigger member stop pin 494 is positioning so that the trigger member stop 457 abuts the stop pin when the ratchet assembly 404 is in the engaged position.

In some embodiments, the ratchet body 428 includes a top portion 462, a bottom portion 464 and opposing sides 468 (one shown). The front of the top portion includes a mounting arm tooth 474 that mates with the first mounting assembly notch 416 and secures the mounting arm to the ratchet assembly 404 when the ratchet assembly is in the engaged position. The back of the front portion includes a ratchet body stop 475 that abuts the ratchet body stop pin 496 when the ratchet assembly is in the engaged position. The bottom portion comprises a trigger member tooth 474 that mates with the trigger member tooth 456 when the ratchet assembly 404 is in the engaged position.

The transverse ratchet body pivot pin bore 476 aligns with the housing ratchet body pivot pin bores 452, so that the ratchet body is pivotably fastened to the housing 424 by the ratchet body pivot pin 478. A pair of coil springs 480 are located on the ratchet body pivot pin adjacent each of the opposing sides of the ratchet body. Each coil spring has a coil spring arm 482 to maintain the position of the coil springs when pressure is applied to engage the mounting assembly 404.

The back surface of the ratchet back body 428 includes a transverse lock groove 491. When the ratchet body is in the engaged position, the transverse lock groove is aligned with the ratchet body lock bores 454. The lock pin 430 can be inserted through the lock bores in order to lock the ratchet assembly 404 in the engaged position. The lock pin can be made of any suitable material and, in some embodiments; it is made of a carbon composite material.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

I claim:

1. A support frame comprising:
   a first vertical support member having a top end and a bottom end, the first vertical support member having a first pair of opposing locking pin openings;
   a second vertical support member having a top end and a bottom end, the second vertical support member having a second pair of opposing locking pin openings;
   a first cross brace having a top surface, a bottom surface and first and second ends, the first end of the first cross brace secured to the top end of the first vertical support member and the second end of the first cross brace secured to the top end of the second vertical support member;
   a second cross brace having a top surface, a bottom surface and first and second ends, the first end of the second cross brace secured to the bottom end of the first vertical support member and the second end of the second cross brace secured to the bottom end of the second vertical support member; and
   a vertical locking assembly secured to one of the surfaces of the second cross brace, the vertical locking assembly comprising a first locking pin aligned with the first locking pin openings and a second locking pin aligned with the second locking pin openings, each locking pin being simultaneously movable between a locked position, wherein the first and second locking pins extend into the first and second opposing locking pin openings, and an unlocked position, wherein the first and second locking pins are withdrawn from the first and second opposing locking pin openings,
   wherein the vertical locking assembly further comprises a handle operably connected to the first and second locking pins, the handle being operable to simultaneously move the first locking pin and the second locking pin.

2. The support frame of claim 1, wherein the vertical locking assembly is secured to the top surface of the second cross brace.

3. The support frame of claim 1, wherein the vertical locking assembly further comprises:
   a first pinion gear operably connected to the first and second locking pin; and a second tooth and pinion gear operably connected to the second locking pin,
wherein the handle is operably connected to the first pinion gear.

4. The support frame of claim 1, wherein each of the first and second cross braces further comprises a first support member opening adjacent the first end of each of the first and second cross braces and a second support member opening adjacent the second end of each of the first and second cross braces, wherein the first support member is located in each of the first support member openings and the second support member is located in each of the second support member openings.

5. The support frame of claim 1, wherein each of the first and second cross braces are removably attached to the first and second vertical support members.

6. The support frame of claim 4, wherein each of the first and second cross braces further comprise a front surface and a back surface and an expansion slot extending from at least one of the support member openings to the front surface or the back surface of the cross brace, and a threaded bore extending from at least one of the front surface or the back surface across the expansion slot.

7. The support frame of claim 1, wherein the support frame further comprises:
a first locating pin having a circular cross section extending axially from the top of the first vertical support member;
a second locating pin having a circular cross section extending axially from the top of the second vertical support member;
an axial first locating pin bore in the bottom of the first support member, the first locating pin bore having a diameter slightly larger than the diameter of the first locating pin;
an axial second locating pin bore in the bottom of the second support member, the second locating pin bore having a diameter slightly larger than the diameter of the second locating pin.

8. A support frame, comprising:
a first vertical support member having a top end and a bottom end;
a second vertical support member having a top end and a bottom end;
a first cross member extending from a location proximate the top end of the first vertical support member to a location proximate the top end of the second vertical support member;
a second cross member extending from a location proximate the bottom end of the first vertical support member to a location proximate the bottom end of the second vertical support member; and
a horizontal attachment assembly comprising:
a pivot member comprising:
a fixed, first vertical support member attachment portion, the first vertical support member attachment portion attached to the first vertical support member;
a pivotable, second vertical support member attachment portion pivotally attached to the first vertical support member attachment portion, the second vertical support member attachment portion including a support member mount,
wherein the first vertical support member attachment portion further comprises:
a substantially planar top surface and a substantially planar bottom surface;
a first support member collar secured to the first vertical support member and abutting the top planar surface; and
a second support member collar, secured to the first vertical support member and abutting the bottom planar surface, together the first and second support member collars securing the horizontal attachment assembly to the first support member, and
wherein the first support member has a circular cross section and each support member collar further comprises:
a support member opening having a diameter slightly larger than the outer diameter of the first support member;
an outer surface including a front surface and a back surface, and an expansion slot extending from the support member opening to the front surface or the back surface of the support member collar; and
a threaded bore extending from the outer surface of the collar across the expansion slot.

9. The support frame of claim 8, wherein the first and second support member collars are slidably attached to the first vertical support member.

10. An attachment plate system, comprising:
an attachment plate having a top, a bottom, two opposing sides, a back surface and a front surface;
at least one vertical mounting assembly mounted on the back surface of the attachment plate, the at least one vertical mounting assembly comprising:
a mounting arm ratchet assembly; and
a mounting arm movable between a first position for engaging with the mounting arm ratchet of an adjacent attachment plate system and a second position for not engaging a mounting arm ratchet of an adjacent attachment plate system,
wherein:
the mounting arm comprises a top, a bottom, a back, a front and first and second opposing sides, with a transverse notch in the front side;
the attachment plate further includes at least one mounting arm support having a first mounting arm slot for slidably supporting the mounting arm for movement in a longitudinal direction; and
the mounting arm ratchet assembly includes:
a mounting arm ratchet assembly housing, the mounting arm ratchet assembly housing comprising a top, a bottom, a back, a front, and two opposing sides, and a second mounting arm slot formed in the front side of the housing for receiving a mounting arm, wherein the first mounting arm slot and the second mounting arm slot are axially aligned; and
a pivotal ratchet assembly supported in the mounting arm ratchet assembly housing, the pivotable ratchet assembly comprising a ratchet body stop pin for engaging the transverse notch on the mounting arm of an adjacent attachment plate system is in the second position.

11. The attachment plate system claim 10, wherein the mounting arm ratchet assembly comprises a trigger assembly for releasing a mounting arm from the first position.

* * * * *

UNITED STATES PATENT AND TRADEMARK OFFICE
CERTIFICATE OF CORRECTION

PATENT NO. : 9,476,575 B2
APPLICATION NO. : 14/195630
DATED : October 25, 2016
INVENTOR(S) : Jeremy Hochman Page 1 of 1

It is certified that error appears in the above-identified patent and that said Letters Patent is hereby corrected as shown below:

In the Claims

In Column 15, Line 10, after the word "first" insert the word --vertical--.
In Column 15, Line 11, after the word "second" insert the word --vertical--.
In Column 15, Line 33, before the word "support" insert the word --vertical--.
In Column 15, Line 34, after the wording "larger than" delete the word "the" and insert the word --a-- therefor.
In Column 15, Line 37, after the first occurrence of the word "second" insert the word --vertical--.
In Column 15, Line 38, after the wording "larger than" delete the word "the" and insert the word --a-- therefor.
In Column 16, Line 11, after the word "first" insert the word --vertical--.
In Column 16, Line 15, after the wording "larger than" delete the word "the" and insert the word --an-- therefor.
In Column 16, Line 15, after the word "first" insert the word --vertical--.
In Column 16, Line 21, after the wording "surface of the" insert the word --support member--.

Signed and Sealed this
Twenty-third Day of October, 2018

Andrei Iancu
*Director of the United States Patent and Trademark Office*